US009438143B2

(12) United States Patent
Suzuki

(10) Patent No.: US 9,438,143 B2
(45) Date of Patent: Sep. 6, 2016

(54) DRIVE CONTROL DEVICE

(71) Applicant: RISO KAGAKU CORPORATION, Tokyo (JP)

(72) Inventor: Masao Suzuki, Ibaraki (JP)

(73) Assignee: Riso Kagaku Corporation, Tokyo (JP)

( * ) Notice: Subject to any disclaimer, the term of this patent is extended or adjusted under 35 U.S.C. 154(b) by 167 days.

(21) Appl. No.: 14/187,177

(22) Filed: Feb. 21, 2014

(65) Prior Publication Data

US 2014/0239854 A1    Aug. 28, 2014

(30) Foreign Application Priority Data

Feb. 22, 2013   (JP) ................................. 2013-033279

(51) Int. Cl.
*G05B 11/28*     (2006.01)
*H02P 5/68*      (2006.01)

(52) U.S. Cl.
CPC ...................... *H02P 5/68* (2013.01)

(58) Field of Classification Search
USPC ........ 318/35, 4, 5, 7, 8, 122, 599, 608, 683, 318/400.14, 560
See application file for complete search history.

(56) References Cited

U.S. PATENT DOCUMENTS

| | | | | |
|---|---|---|---|---|
| 5,446,646 A | * | 8/1995 | Miyazaki | H02M 7/219 323/207 |
| 2002/0113615 A1 | * | 8/2002 | Atarashi | B60L 11/1803 318/400.01 |
| 2004/0169484 A1 | * | 9/2004 | Iribe et al. | 318/568.11 |
| 2004/0207347 A1 | * | 10/2004 | Daboussi | H02P 9/305 318/135 |
| 2011/0084643 A1 | * | 4/2011 | Ams | 318/798 |
| 2013/0249517 A1 | * | 9/2013 | Shiraishi | G05F 1/468 323/283 |

FOREIGN PATENT DOCUMENTS

| JP | 2004-274974 A | | 9/2004 |
|---|---|---|---|
| JP | 2005-176472 A | | 6/2005 |
| JP | 2005176472 A | * | 6/2005 |

* cited by examiner

*Primary Examiner* — Jorge L Carrasquillo
(74) *Attorney, Agent, or Firm* — Studebaker & Brackett PC

(57) ABSTRACT

A PWM signal generator section for generating a plurality of PWM signals with different phases to be respectively fed to a plurality of loads, and a phase difference setting section for setting phase differences among the PWM signals are provided. The phase difference setting section sets phase differences $\Delta t\_shift(n,n+1)$ calculated based on an effective current $Ia(n)$ flowing to each of the loads, where the number of the loads is N, according to the equations below:

$$Ia\_all = \sum_{n=1}^{N} Ia(n)$$

$$\Delta t\_shift(n, n+1) = t\_pwn \times Ia(n)/Ia\_all$$

where n=1 to N (where N is an integer of two or more, and n+1=1 when n+1>N), and t_pwm is a cycle of the PWM signals.

5 Claims, 22 Drawing Sheets

FIG.9

| CHARACTERISTICS OF PARAMETER SETTINGS | | ITEM | UNIT | M_1 | M_2 | M_3 | M_4 | M_5 | All |
|---|---|---|---|---|---|---|---|---|---|
| Case1 | MOTORS HAVE DIFFERENT ROTATIONAL SPEEDS | ROTATIONAL SPEED | r p m | 600 | 900 | 1200 | 1500 | 1800 | |
| | | LOAD TORQUE | N·m | 0.1171 | 0.10865 | 0.1002 | 0.09175 | 0.0833 | |
| | | EFFECTIVE CURRENT | A | 1.09622 | 0.98282 | 0.86942 | 0.87629 | 0.76289 | 4.5876 |
| | DISTRIBUTION BASED ON CURRENT | | % | 24 | 21 | 19 | 19 | 17 | 100 |
| | MAXIMUM-TO-MINIMUM RATIO: 3:1 | EFFECTIVE VOLTAGE | V | 10.15 | 13.3 | 16.45 | 19.95 | 23.1 | 82.95 |
| | | DISTRIBUTION BASED ON VOLTAGE | % | 12 | 16 | 20 | 24 | 28 | 100 |
| | | EFFECTIVE POWER | W | 11.1266 | 13.0715 | 14.3019 | 17.482 | 17.6227 | 73.605 |
| | DISTRIBUTION BASED ON ELECTRIC POWER | | % | 15 | 18 | 19 | 24 | 24 | 100 |
| Case2 | MOTORS HAVE DIFFERENT LOAD TORQUES | ROTATIONAL SPEED | r p m | 750 | 800 | 850 | 900 | 950 | |
| | | LOAD TORQUE | N·m | 0.22678 | 0.1874 | 0.14803 | 0.10865 | 0.06928 | |
| | | EFFECTIVE CURRENT | A | 2.06186 | 1.74227 | 1.30241 | 0.98282 | 0.66323 | 6.7526 |
| | DISTRIBUTION BASED ON CURRENT | | % | 31 | 26 | 19 | 15 | 10 | 101 |
| | MAXIMUM-TO-MINIMUM RATIO: 3:1 | EFFECTIVE VOLTAGE | V | 14.7 | 14.35 | 13.65 | 13.3 | 12.95 | 68.95 |
| | | DISTRIBUTION BASED ON VOLTAGE | % | 21 | 21 | 20 | 19 | 19 | 100 |
| | | EFFECTIVE POWER | W | 30.3093 | 25.0015 | 17.7778 | 13.0715 | 8.58883 | 94.749 |
| | DISTRIBUTION BASED ON ELECTRIC POWER | | % | 32 | 26 | 19 | 14 | 9 | 100 |
| Case3 | OPPOSITE COMBINATION OF DRIVE CONDITIONS OF MOTORS FROM THOSE OF Case2 | ROTATIONAL SPEED | r p m | 750 | 800 | 850 | 900 | 950 | |
| | | LOAD TORQUE | N·m | 0.06598 | 0.107 | 0.14803 | 0.18905 | 0.23008 | |
| | | EFFECTIVE CURRENT | A | 0.61856 | 1.02062 | 1.30241 | 1.70447 | 2.10653 | 6.7526 |
| | DISTRIBUTION BASED ON CURRENT | | % | 9 | 15 | 19 | 25 | 31 | 99 |
| | MAXIMUM-TO -MINIMUM RATIO: 3:1 | EFFECTIVE VOLTAGE | V | 10.5 | 12.25 | 13.65 | 15.4 | 17.15 | 68.95 |
| | | DISTRIBUTION BASED ON VOLTAGE | % | 15 | 18 | 20 | 22 | 25 | 100 |
| | | EFFECTIVE POWER | W | 6.49485 | 12.5026 | 17.7778 | 26.2488 | 36.127 | 99.151 |
| | DISTRIBUTION BASED ON ELECTRIC POWER | | % | 7 | 13 | 18 | 26 | 36 | |
| Case4 | COMBINATION OF DRIVE CONDITIONS OF MOTORS OF Case1 AND Case2 | ROTATIONAL SPEED | r p m | 600 | 900 | 1200 | 1500 | 1800 | |
| | | LOAD TORQUE | N·m | 0.2243 | 0.18905 | 0.1538 | 0.11855 | 0.0833 | |
| | | EFFECTIVE CURRENT | A | 2.05842 | 1.70447 | 1.35052 | 1.11684 | 0.76289 | 6.9931 |
| | DISTRIBUTION BASED ON CURRENT | | % | 29 | 24 | 20 | 16 | 11 | 100 |
| | LOW SPEED AND HIGH LOAD TO HIGH SPEED AND LOW LOAD | EFFECTIVE VOLTAGE | V | 12.95 | 15.4 | 17.85 | 20.65 | 23.1 | 89.95 |
| | | DISTRIBUTION BASED ON VOLTAGE | % | 14 | 17 | 20 | 23 | 26 | 100 |
| | | EFFECTIVE POWER | W | 26.6565 | 26.2488 | 24.1067 | 23.0627 | 17.6227 | 117.7 |
| | DISTRIBUTION BASED ON ELECTRIC POWER | | % | 23 | 22 | 20 | 20 | 15 | 100 |
| DISTRIBUTION BASED ON NUMBER OF MOTORS (ALL THE CASES) | | DISTRIBUTION BASED ON NUMBER | % | 20 | 20 | 20 | 20 | 20 | 100 |

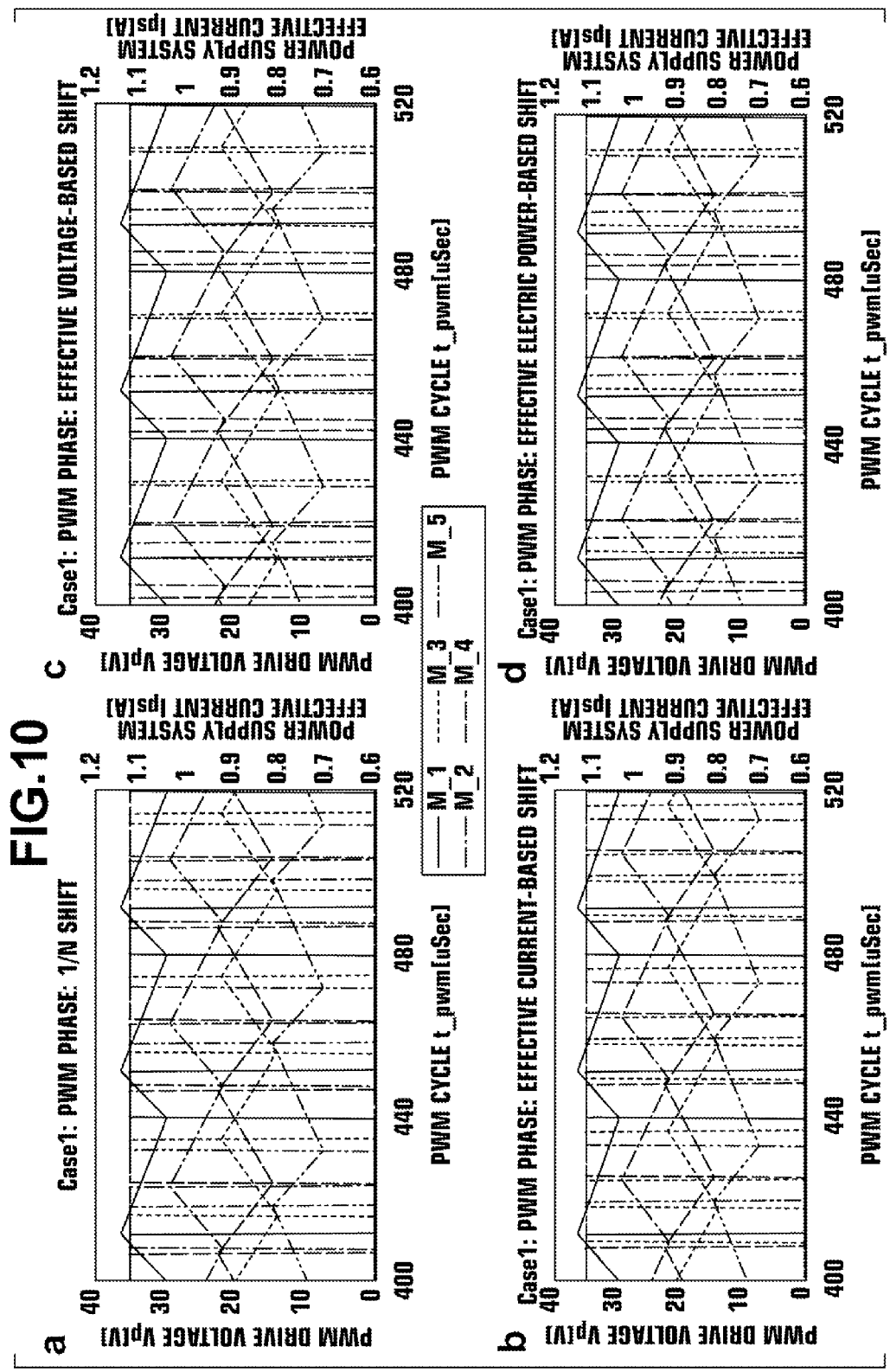

DRIVE CONTROL DEVICE

BACKGROUND OF THE INVENTION

1. Field of the Invention

The present invention relates to a drive control device that performs drive control of a plurality of loads based on PWM signals.

2. Description of the Related Art

Conventionally, drive control devices that perform drive control of electromagnetic actuators, such as motors or solenoids, using PWM signals have been proposed.

In particular, for a printing apparatus, such as an inkjet printer, including a paper transport system using a plurality of DC motors to convey printing paper sheets, a device to perform drive control of the DC motors by directly feeding a PWM signal to each DC motor has been proposed.

During drive control of a DC motor using a PWM signal, a drive current flows to the DC motor from a drive power supply that is connected to the DC motor for an ON period of the PWM signal. At this time, it is known that a so-called ripple current is generated when the pulse of the PWM signal rises and falls.

Then, in the case where the drive control of a plurality of DC motors is performed using PWM signals, as mentioned above, if the PWM signals fed to the individual motors have the same phase, for example, ripple currents are generated at the same time when the PWM signals rise and fall and the ripple currents are added, causing electromagnetic noise at the drive power supply. Further, in a case where a smoothing capacitor is provided to reduce influence of the ripple currents, it is necessary to provide the capacitor with a large capacity, and this results in cost increase.

In order to address this problem, Japanese Unexamined Patent Publication Nos. 2004-274974 (Patent Document 1) and 2005-176472 (Patent Document 2), for example, have proposed methods for reducing influence of ripple currents, where, during drive control of a plurality of loads using PWM signals, phases of the PWM signals fed to the individual loads are shifted from each other.

SUMMARY OF THE INVENTION

In Patent Documents 1 and 2, drive control of two electric fans using PWM signals is performed with setting a phase difference corresponding to a half cycle of the PWM signals, that is, a time obtained by dividing the cycle of the PWM signals by the number of the electric fans.

However, in the case of the drive control of a plurality of DC motors of a paper transport system using PWM signals, as described above, rotational speeds and load torques required for the individual DC motors are different from each other, and thus the PWM signals fed to the individual DC motors have different duty ratios. Therefore, a phase difference that is set by simply dividing the cycle of the PWM signals by the number of DC motors may not always reduce the total value of the ripple currents that are generated when the PWM signals rise and fall.

In view of the above-described circumstances, the present invention is directed to providing a drive control device that can achieve reduction of the ripple currents during the drive control of a plurality of DC motors using PWM signals, as described above.

An aspect of the drive control device of the invention is a drive control device for performing drive control of a plurality of loads based on PWM signals, the device including: a PWM signal generator section for generating the PWM signals with different phases to be respectively fed to the loads; and a phase difference setting section for setting phase differences among the PWM signals, wherein the phase difference setting section sets phase differences $\Delta t\_shift(n,n+1)$ calculated based on an effective current $Ia(n)$ flowing to each of the loads, where the number of the loads is N, according to the equations below:

$$Ia\_all = \sum_{n=1}^{N} Ia(n)$$

$$\angle t\_shift(n, n+1) = t\_pwn \times Ia(n)/Ia\_all$$

where n=1 to N, N is an integer of two or more, n+1=1 when n+1>N, and t_pwm is a cycle of the PWM signals.

Another aspect of the drive control device of the invention is a drive control device for performing drive control of a plurality of loads based on PWM signals, the device including: a PWM signal generator section for generating the PWM signals with different phases to be respectively fed to the loads; and a phase difference setting section for setting phase differences among the PWM signals, wherein the phase difference setting section sets phase differences $\Delta t\_shift(n,n+1)$ calculated based on an effective voltage $Va(n)$ fed to each of the loads, where the number of the loads is N, according to the equations below:

$$Va\_all = \sum_{n=1}^{N} Va(n)$$

$$\angle t\_shift(n, n+1) = t\_pwn \times Va(n)/Va\_all$$

where n=1 to N, N is an integer of two or more, n+1=1 when n+1>N, and t_pwm is a cycle of the PWM signals.

Yet another aspect of the drive control device of the invention is a drive control device for performing drive control of a plurality of loads based on PWM signals, the device including: a PWM signal generator section for generating the PWM signals with different phases to be respectively fed to the loads; and a phase difference setting section for setting phase differences among the PWM signals, wherein the phase difference setting section sets phase differences $\Delta t\_shift(n,n+1)$ calculated based on an effective electric power $Pa(n)$ consumed by each of the loads, where the number of the loads is N, according to the equations below:

$$Pa(n) = Ia(n) \times Va(n)$$

$$Pa\_all = \sum_{n=1}^{N} Pa(n)$$

$$\angle t\_shift(n, n+1) = t\_pwn \times Pa(n)/Pa\_all$$

where n=1 to N, N is an integer of two or more, n+1=1 when n+1>N, and t_pwm is a cycle of the PWM signals.

Still another aspect of the drive control device of the invention is a drive control device for performing drive control of a plurality of loads based on PWM signals, the device including: a PWM signal generator section for generating the PWM signals with different phases to be respectively fed to the loads; and a phase difference setting section for setting phase differences among the PWM signals, wherein the phase difference setting section sets, in a switchable manner, one of sets of phase differences Δt_shift(n, n+1) calculated according to at least two of the equations (1) to (4) below:

$$\Delta t\_shift(n, n+1) = t\_pwm/N \quad (1)$$

where n=1 to N, N is an integer of two or more, n+1=1 when n+1>N, and t_pwm is a cycle of the PWM signals, $$\text{Ia\_all} = \sum_{n=1}^{N} Ia(n) \quad (2)$$

$$\Delta t\_shift(n, n+1) = t\_pwm \times Ia(n)/\text{Ia\_all}$$

where n=1 to N, N is an integer of two or more, n+1=1 when n+1>N, t_pwm is a cycle of the PWM signals, and Ia(n) is an effective current flowing to each of the N loads, $$\text{Va\_all} = \sum_{n=1}^{N} Va(n) \quad (3)$$

$$\Delta t\_shift(n, n+1) = t\_pwm \times Va(n)/\text{Va\_all}$$

where n=1 to N, N is an integer of two or more, n+1=1 when n+1>N, t_pwm is a cycle of the PWM signals, and Va(n) is an effective voltage fed to each of the N loads, and $$Pa(n) = Ia(n) \times Va(n) \quad (4)$$

$$\text{Pa\_all} = \sum_{n=1}^{N} Pa(n)$$

$$\Delta t\_shift(n, n+1) = t\_pwm \times Pa(n)/\text{Pa\_all}$$

where n=1 to N, N is an integer of two or more, n+1=1 when n+1>N, t_pwm is a cycle of the PWM signals, and Pa(n) is an effective electric power consumed by each of the N loads.

In the above-described drive control device of the invention, the phase difference setting section may select and set one of at least two sets of phase differences Δt_shift(n,n+1) based on a total value of the effective currents Ia(n) flowing to the individual loads in each of cases where the at least two sets of phase differences Δt_shift(n,n+1) calculated according to the at least two of the equations (1) to (4) are respectively set for the PWM signals.

According to the drive control device of the invention, when the drive control of a plurality of loads using a plurality of PWM signals is performed as described above, the phase differences among the PWM signals are set based on the effective current, the effective voltage or the effective electric power of each load. Therefore, timing of rise and fall of the PWM signals can be distributed evenly, thereby reducing the total value of the ripple currents due to the PWM signals.

This allows reducing electromagnetic noise occurring at the drive power supply, and improving leakage of harmonic distortion to a commercial power supply to which the drive power supply is connected. Further, the capacity of a smoothing capacitor that reduces the influence of the ripple currents can be reduced, thereby allowing cost reduction.

Further, in the case where the drive control of a plurality of DC motors using PWM signals is performed as described above, if the rotational speed or the load torque of each DC motor is changed, the phase differences to be set can be changed appropriately, and this allows always keeping the influence of the ripple currents small.

BRIEF DESCRIPTION OF THE DRAWINGS

FIG. 9 shows results of simulations of effective current, effective voltage and effective electric power in four cases Case1 to Case4, FIG. 10 shows voltage waveforms of PWM signals and waveforms of ripple currents when phase differences are set based on the number of motors in the Case1 at "a", voltage waveforms of PWM signals and waveforms of ripple currents when phase differences are set based on effective currents of motors M_1 to M_5 in the Case1 at "b", voltage waveforms of PWM signals and waveforms of ripple currents when phase differences are set based on effective voltages of the motors M_1 to M_5 in the Case1 at "c", and voltage waveforms of PWM signals and waveforms of ripple currents when phase differences are set based on effective electric powers of the motors M_1 to M_5 in the Case1 at "d"

DESCRIPTION OF THE PREFERRED EMBODIMENTS

Figure 1:
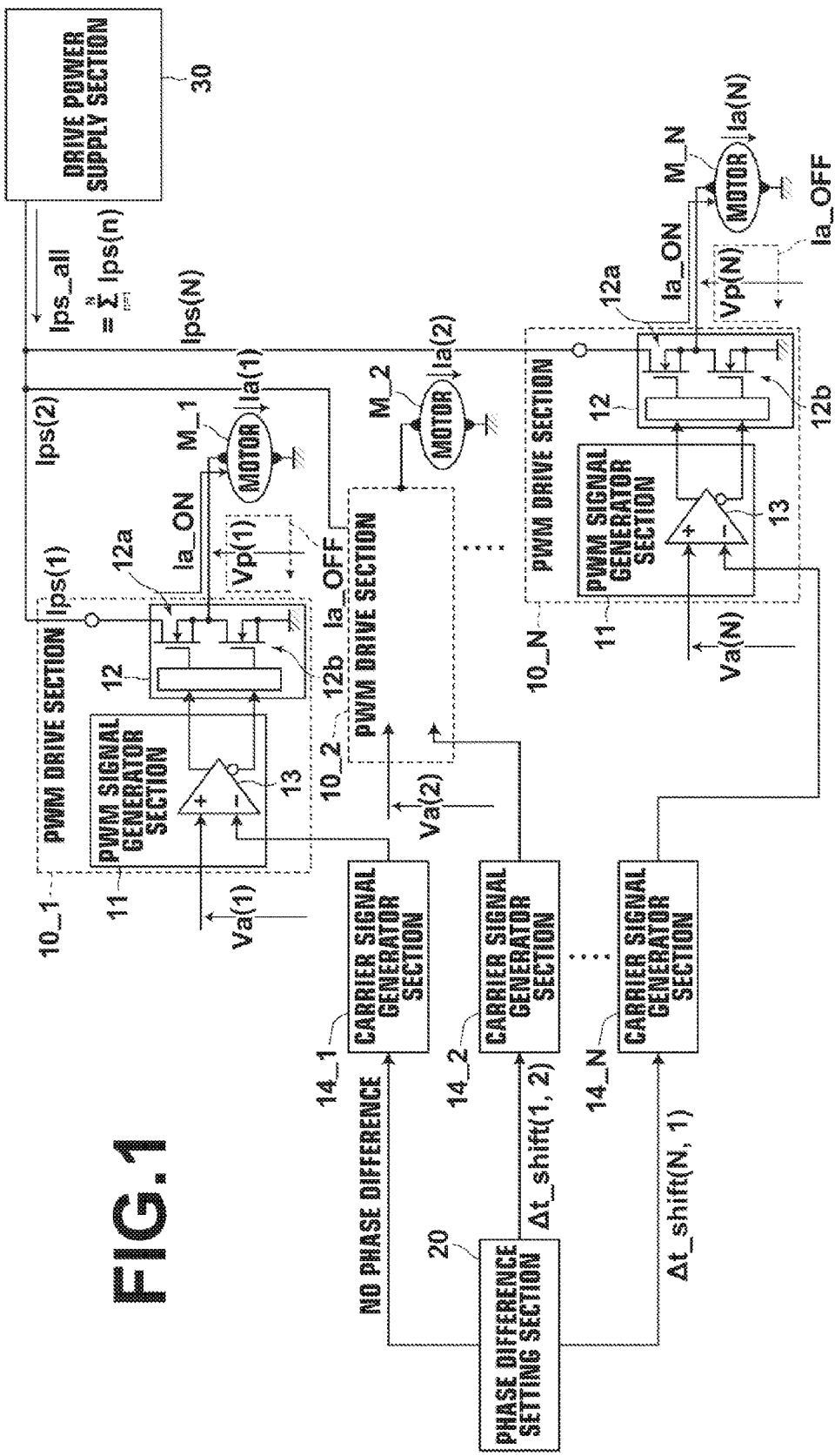
FIG. 1 is a diagram illustrating the schematic configuration of a motor drive control device that employs a first embodiment of a drive control device of the present invention.

Hereinafter, a motor drive control device employing a first embodiment of a drive control device of the invention will be described in detail with reference to the drawings. FIG. 1 is a diagram illustrating the schematic configuration of the motor drive control device of this embodiment.

As shown in FIG. 1, the drive control device of this embodiment includes N (where N is an integer of two or more) motors M_1 to M_N, N PWM drive sections 10_1 to 10_N, N carrier signal generator sections 14_1 to 14_N, a phase difference setting section 20, and a drive power supply section 30.

It should be noted that, as described above, the N PWM drive sections 10_1 to 10_N and the N carrier signal generator sections 14_1 to 14_N are provided correspondingly to the N motors. Since the N PWM drive sections 10_1 to 10_N have the same configuration and the N carrier signal generator sections are disposed in the same manner, some of the PWM drive sections and some of the carrier signal generator sections are omitted in FIG. 1.

The motors M_1 to M_N are formed by DC motors, which are connected to the PWM drive sections 10_1 to 10_N, respectively, and driven by drive currents outputted from the PWM drive sections 10_1 to 10_N, respectively.

Each of the PWM drive sections 10_1 to 10_N includes a PWM signal generator section 11 and a switch circuit section 12. The PWM signal generator section 11 includes a comparator 13, to which a carrier signal of a triangular waveform or a sawtooth waveform outputted from corresponding one of the carrier signal generator sections 14_1 to 14_N is inputted. The comparator 13 generates a PWM signal formed by a rectangular wave based on the inputted carrier signal.

The switch circuit section 12 includes two switch elements 12a and 12b. When the PWM signal outputted from the PWM signal generator section 11 is inputted to the switch circuit 12 and the PWM signal indicates the ON period, the switch element 12a is turned into the ON state and the switch 12b is turned into the OFF state. This allows a drive current Ia_ON from the drive power supply section 30 to flow to corresponding one of the motors M_1 to M_N. When the PWM signal inputted to the switch circuit 12 indicates the OFF period, the switch element 12a is turned into the OFF state and the switch 12b is turned into the ON state. This allows a drive current Ia_OFF to flow to corresponding one of the motors M_1 to M_N due to the induction effect of the motor. In this description, each of effective currents Ia(1) to Ia(N) of the motors M_1 to M_N refers to a combined current of the above-described drive currents Ia_ON and Ia_OFF.

The carrier signal generator sections 14_1 to 14_N output carrier signals of a triangular waveform or a sawtooth waveform to the PWM drive sections 10_1 to 10_N, as described above. The N carrier signal generator sections 14_1 to 14_N of this embodiment output carrier signals with different phases. Phase differences among the carrier signals outputted from the carrier signal generator sections 14_1 to 14_N are set at the phase difference setting section 20, and the carrier signal generator sections 14_1 to 14_N generate the carrier signals based on information of the phase differences outputted from the phase difference setting section 20.

At the phase difference setting section 20, the phase differences among the carrier signals outputted from the carrier signal generator sections 14_1 to 14_N are set, as described above, and the phase difference setting section 20 outputs the information of the phase differences to the carrier signal generator sections 14_1 to 14_N.

Specifically, at the phase difference setting section 20 of this embodiment, phase differences $\Delta t\_shift(n,n+1)$ that are calculated based on the effective current $Ia(n)$ flowing to each of the motors M_1 to M_N according to the equations below are set:

$$Ia\_all = \sum_{n=1}^{N} Ia(n)$$

$$\Delta t\_shift(n, n+1) = t\_pwm \times Ia(n) / Ia\_all$$

where n=1 to N (where N is an integer of two or more, and n+1=1 when n+1>N), and t_pwm is a cycle of the PWM signals. The phase differences $\Delta t\_shift(n,n+1)$ are calculated and set at the phase difference setting section 20 in advance. How the phase differences $\Delta t\_shift(n,n+1)$ are calculated will be described in detail later.

As shown in FIG. 1, the drive power supply section 30 is connected to the switch element of the switch circuit section 12 of each of the PWM drive sections 10_1 to 10_N and feeds a predetermined DC voltage to the switch element 12a of each switch circuit section 12. As described above, when the PWM signal inputted to the switch circuit 12 indicates the ON period, the switch element 12a is turned into the ON state and the drive current Ia_ON from the drive power supply section 30 flows to corresponding one of the motors M_1 to M_N. At this time, corresponding one of power supply system effective currents Ips(1) to Ips(N) flows at the drive power supply section 30 side. That is, Ia_ON=Ips.

It should be noted that, as the carrier signal generator sections 14_1 to 14_N, the PWM drive sections 10_1 to 10_N and the drive power supply section 30 shown in FIG. 1, those contained in built-in DSPs (Digital Signal Processors) as hardware devices may be used, and the phase difference setting section 20 may be programmably set in a built-in DSP.

Figure 2:
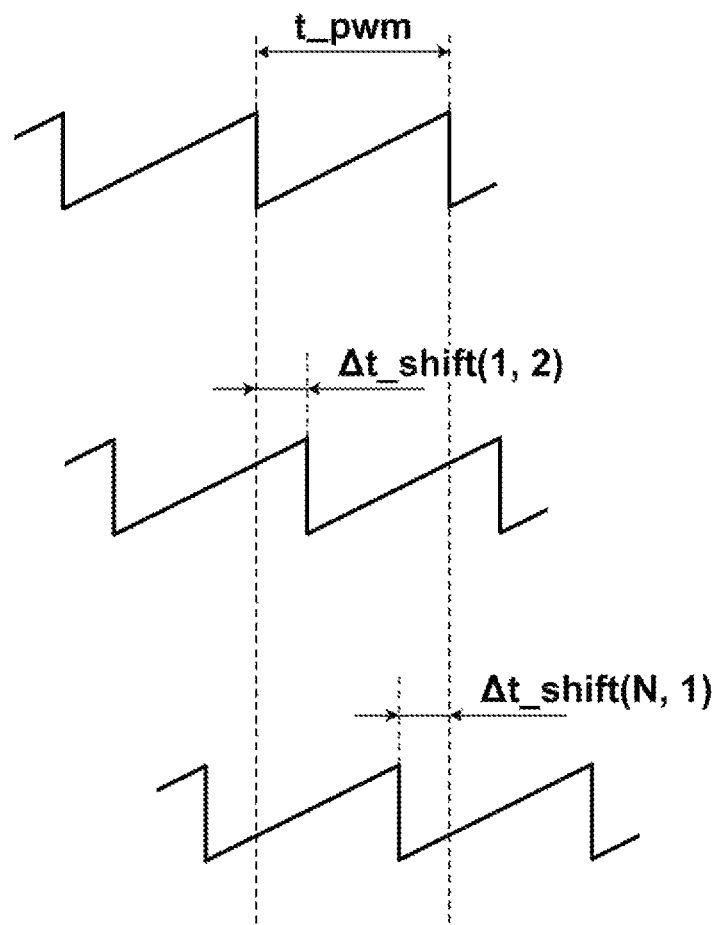
FIG. 2 is a diagram illustrating one example of carrier signals with different phases.

FIG. 2 shows one example of the carrier signals outputted from the carrier signal generator sections 14_1, 14_2 and 14_N based on the phase differences Δt_shift(n,n+1) set at the phase difference setting section 20.

As shown in FIG. 2, the carrier signals with the phase differences Δt_shift(n,n+1) are outputted from the carrier signal generator sections 14_1 to 14_N, and the carrier signals are inputted to the PWM drive sections 10_1 to 10_N.

Then, based on the inputted carrier signals with different phases, the PWM signal generator section 11 of each of the PWM drive sections 10_1 to 10_N generates the PWM signal, and a drive current based on the PWM signal is fed to each of the motors M_1 to M_N connected to the PWM drive sections 10_1 to 10_N, so that each of the motors M_1 to M_N is driven based on the fed drive current.

In the above-described motor drive control device of the first embodiment, the phase difference t_shift(n,n+1) of each carrier signal is calculated based on the effective current Ia(n) flowing to each of the motors M_1 to M_N, as described above, and the phase differences are set at the phase difference setting section 20. The effective current Ia(n) is calculated with taking electrical parameters of each of the motors M_1 to M_N, such as a rotation speed, a load torque, a winding inductance, a winding resistance, etc., required for each of the motors M_1 to M_N, parameters of mechanical elements, etc., into account.

The effective current Ia(n) of each of the motors M_1 to M_N can be calculated by a simulation based on an equivalent circuit of the DC motor. Now, a simulation model based on the equivalent circuit is described.

Figure 3:
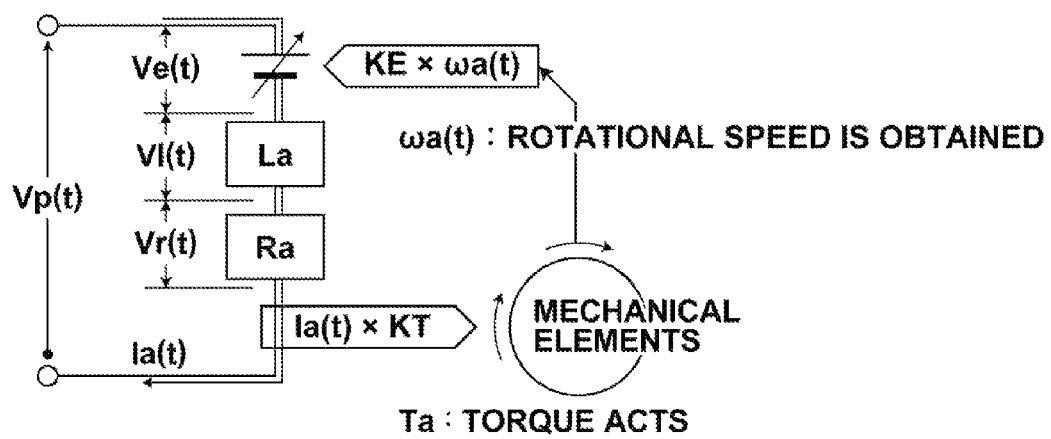
FIG. 3 is an equivalent circuit schematic of a DC motor.
Figure 4:
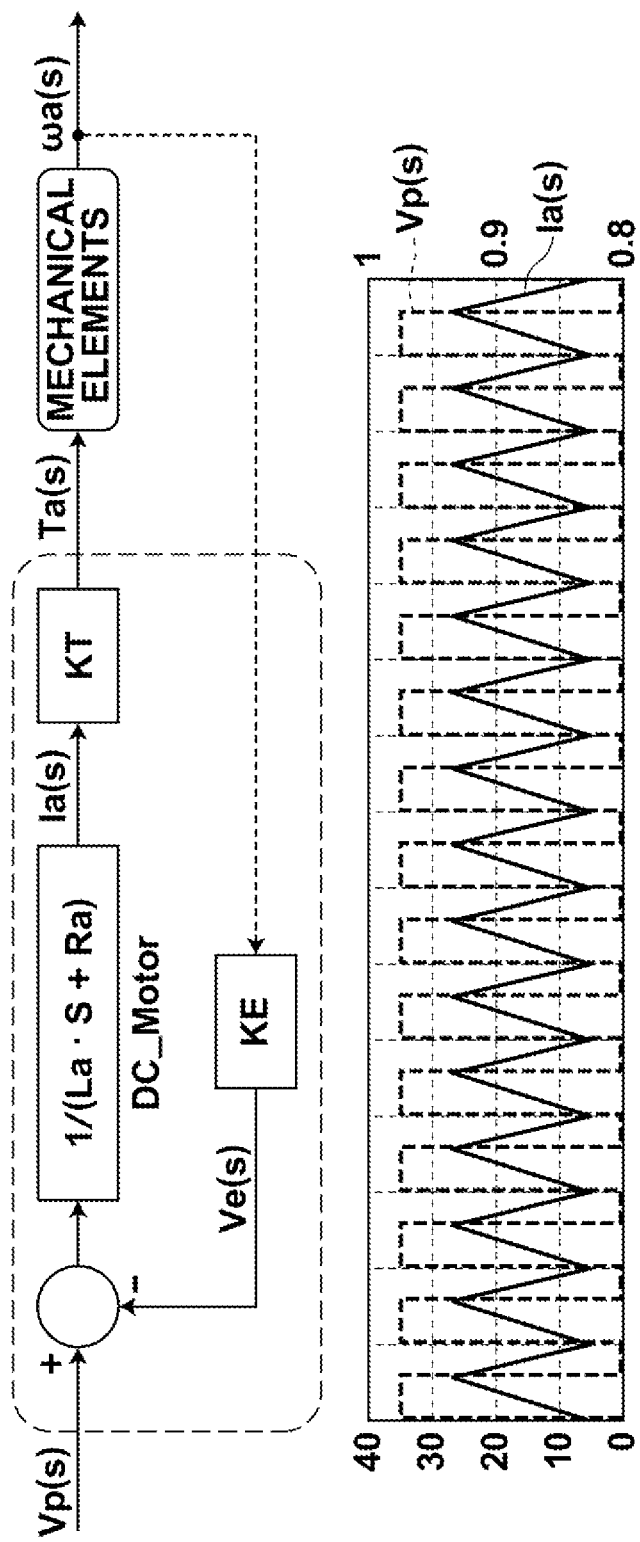
FIG. 4 is a block diagram of the DC motor.

First, the DC motor can be represented by an equivalent circuit as shown in FIG. 3. FIG. 4 shows a block diagram representation of the equivalent circuit shown in FIG. 3, and also shows one example of waveforms of the Vp(s) and Ia (s). Contents of the parameters are as follows:
voltage between terminals (a PWM voltage fed to a motor): Vp[V], counter electromotive voltage (a voltage generated by rotation of the motor itself): Ve[V],
induced voltage constant: KE[V/(rad/s)],
winding inductance: La[H],
winding resistance: Ra[Ω],
winding current: Ia[A],
torque constant: KT[N·m/A],
generated torque: Ta[N·m], and
angular velocity: ωa[rad/s].

Then, according to the equivalent circuit shown in FIG. 3, equations representing the DC motor are as follows:

$Vp(t)=La \cdot dIa(t)/dt+Ra \cdot Ia(t)+Ve(t)$, $Ve(t)=KE \cdot \omega a(t)$, and $Ta(t)=KT \cdot Ia(t)$.

Then, S function representation of the above equations after the Laplace transform are as follows:

$Vp(s)=La \cdot S \cdot Ia(s)+Ra \cdot Ia(s)+Ve(s)$, and $Ve(s)=KE \cdot \omega a(s)$.

Therefore, equations with respect to the effective current are as follows, and thus the effective current Ia(s) can be calculated:

$Ia(s)=(Vp(s)-KE \cdot \omega a(s))/(La \cdot S+Ra)$, and $Ta(s)=KT \cdot Ia(s)$.

Figure 5:
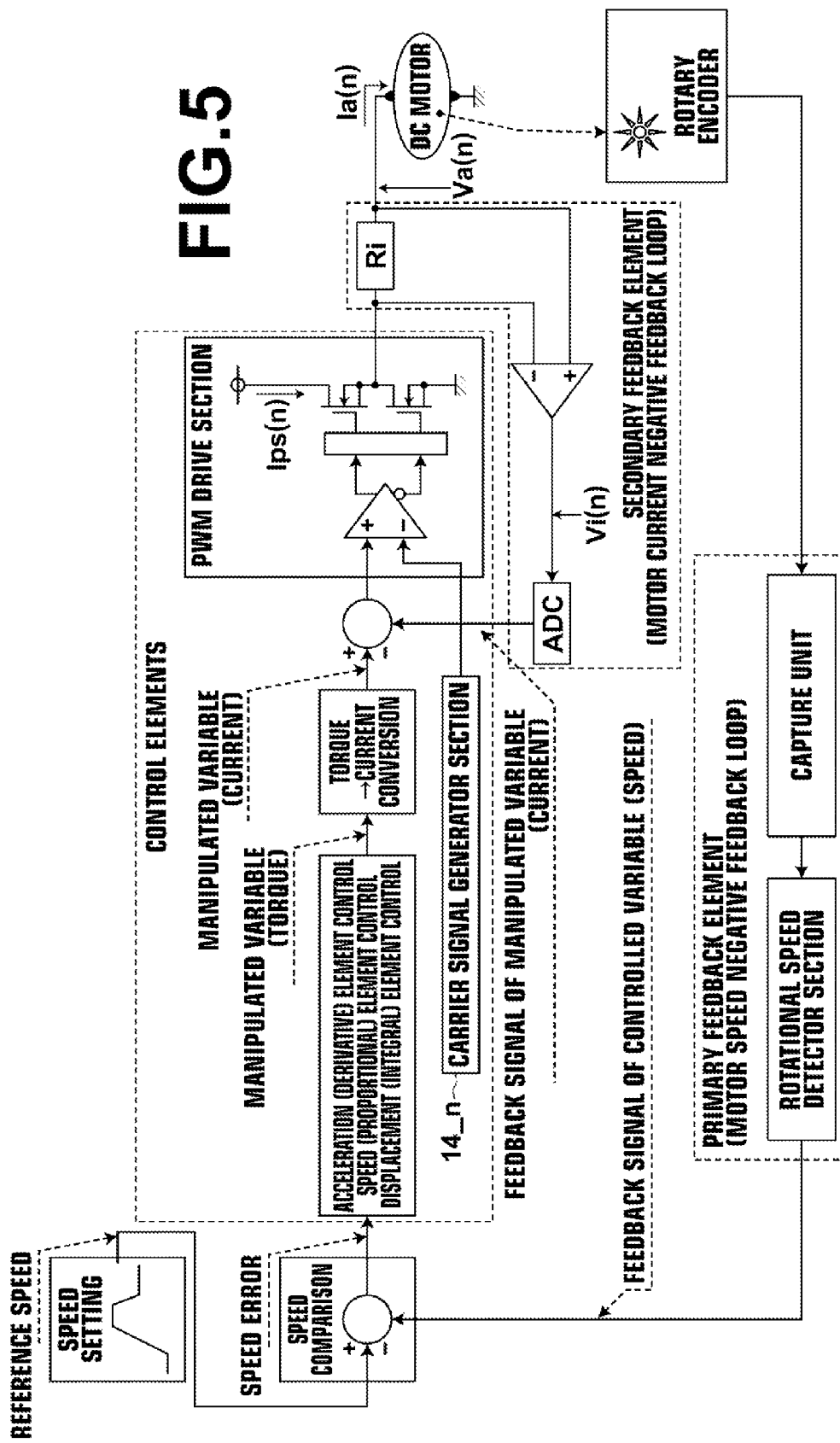
FIG. 5 is a diagram illustrating a system configuration for performing PID control of a DC motor.

Further, a simulation may be performed as a configuration for performing PID control of the DC motor shown in FIGS. 3 and 4. FIG. 5 is a diagram illustrating a system configuration for performing the PID control of the DC motor. In this system, the rotational speed of the DC motor is detected with a rotary encoder, and the rotational speed is obtained by a capture unit and a rotational speed detector section. Then, a difference between the speed obtained by the rotational speed detector section and a reference speed set in advance is obtained as a speed error. Based on this speed error, a manipulated variable (torque) of acceleration, speed and displacement is calculated. Then, based on this manipulated variable (torque), a manipulated variable of the current is calculated and fed to the PWM drive section. At this time, a current due to a motor current negative feedback loop is also taken into account. It should be noted that the PID control of a DC motor is a well-known technique and therefore a detailed description thereof is omitted. It should be noted that the carrier signal generator section shown in FIG. 1 is omitted in FIG. 5.

Figure 6:
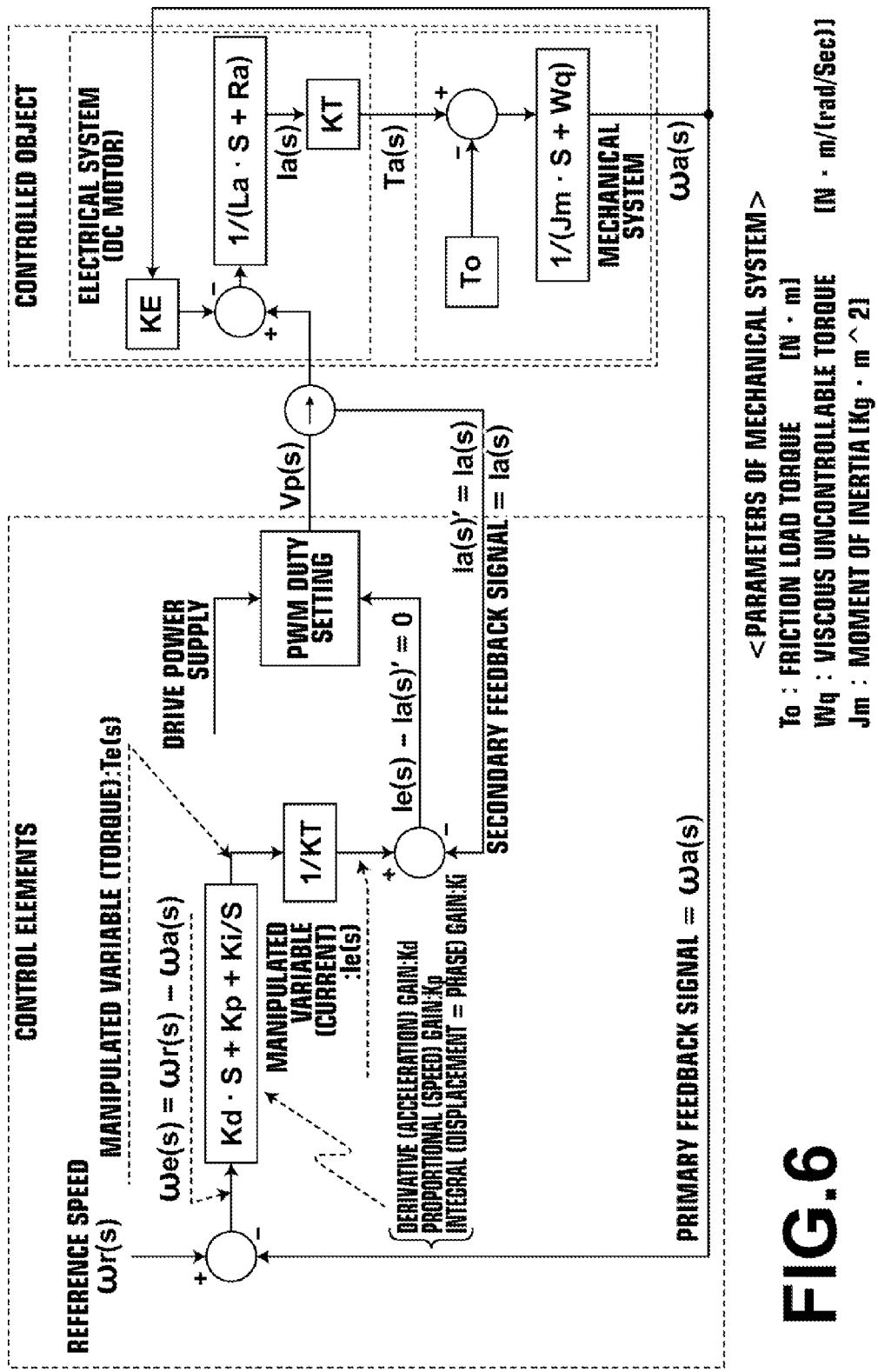
FIG. 6 is a block diagram of the PID control system shown in FIG. 5.

FIG. 6 is a block diagram representation of the system configuration shown in FIG. 5. The effective current Ia(s) may be found by performing a simulation based on the block diagram as shown in FIG. 6.

It should be noted that, while the effective current Ia(s) of each of the motors M_1 to M_N is calculated by the simulation in the above description, the effective current Ia(n) may be actually measured based on a Vi(n) detected by a secondary feedback element shown in FIG. 5, for example, according to the equation below:

$Vi(n)=Ri \cdot Ia(n) \cdot \alpha$, and hence, $Ia(n)=Vi(n)/(Ri \cdot \alpha)$, where α is a gain of a current detection amplifier.

According to the above-described motor drive control device of the first embodiment, the phase differences among the PWM signals are set using each effective current that is calculated based on a rotation speed and a load torque required for each of the motors M_1 to M_N, as described above. Therefore, timing of rise and fall of the PWM signals can be distributed evenly, thereby reducing the total value of the ripple currents due to the PWM signals.

Next, a motor drive control device employing a second embodiment of the drive control device of the invention is described. The schematic configuration of the motor drive control device of the second embodiment is the same as that of the motor drive control device of the first embodiment shown in FIG. 1.

In the above-described motor drive control device of the first embodiment, the phase differences Δt_shift(n,n+1) of the PWM signals fed to the motors M_1 to M_N are set based on the effective current Ia(n) of each of the motors M_1 to M_N. The motor drive control device of the second embodiment differs from the first embodiment in that the phase differences Δt_shift(n,n+1) are set based on effective voltage Va(n), rather than the effective current Ia(n), of each of the motors M_1 to M_N.

Namely, at the phase difference setting section 20 of the second embodiment, the phase differences Δt_shift(n,n+1) calculated based on the effective voltage Va(n) fed to each of the motors M_1 to M_N according to the equations below are set:

$$Va\_all = \sum_{n=1}^{N} Va(n)$$

$$\Delta t\_shift(n, n+1) = t\_pwm \times Va(n) / Va\_all$$

where n=1 to N (where N is an integer of two or more, and n+1=1 when n+1>N), and t_pwm is a cycle of the PWM signals. Similarly to the effective current Ia(n), the effective voltage Va(n) can be calculated by the above-described simulation.

The other features of the motor drive control device of the second embodiment are the same as those of the first embodiment.

According to the above-described motor drive control device of the second embodiment, the phase differences among the PWM signals are set using each effective voltage that is calculated based on a rotation speed and a load torque required for each of the motors M_1 to M_N, as described above. Therefore, similarly to the first embodiment, timing of rise and fall of the PWM signals can be distributed evenly, thereby reducing the total value of the ripple currents due to the PWM signals.

Next, a motor drive control device employing a third embodiment of the drive control device of the invention is described. The schematic configuration of the motor drive control device of the third embodiment is the same as that of the motor drive control device of the first embodiment shown in FIG. 1.

The motor drive control device of the third embodiment differs from the first embodiment in that the phase differences Δt_shift(n,n+1) are set based on an effective electric power Pa(n) of each of the motors M_1 to M_N.

Namely, at the phase difference setting section 20 of the third embodiment, the phase differences Δt_shift(n,n+1) calculated based on the effective electric power Pa(n) consumed by each of the motors M_1 to M_N according to the equations below are set:

$$Pa(n) = Ia(n) \times Va(n)$$

$$Pa\_all = \sum_{n=1}^{N} Pa(n)$$

$$\Delta t\_shift(n, n+1) = t\_pwm \times Pa(n) / Pa\_all$$

where n=1 to N (where N is an integer of two or more, and n+1=1 when n+1>N), and t_pwm is a cycle of the PWM signals. Similarly to the effective current Ia(n) and the effective voltage Va(n), the effective electric power Pa(n) can be calculated by the above-described simulation.

The other features of the motor drive control device of the third embodiment are the same as those of the first embodiment.

According to the above-described motor drive control device of the third embodiment, the phase differences among the PWM signals are set using each effective electric power that is calculated based on a rotation speed and a load torque required for each of the motors M_1 to M_N, as described above. Therefore, similarly to the first and second embodiments, timing of rise and fall of the PWM signals can be distributed evenly, thereby reducing the total value of the ripple currents due to the PWM signals.

Next, a motor drive control device employing a fourth embodiment of the drive control device of the invention is described. The schematic configuration of the motor drive control device of the fourth embodiment is the same as that of the motor drive control device of the first embodiment shown in FIG. 1.

In the motor drive control device of the fourth embodiment, the configuration of the phase difference setting section 20 differs from that of the motor drive control devices of the first to third embodiments. At the phase difference setting section 20 of this embodiment, one of sets of phase differences Δt_shift(n,n+1) calculated based on equations (1) to (4) below is set in a switchable manner.

It should be noted that, among the equations (1) to (4) below, the equations (2) to (3) are the same as those used in the above-described first to third embodiments. The equation (1) below is used to calculate the phase differences Δt_shift(n,n+1) based on the number of the motors M_1 to M_N.

$$\Delta t\_shift(n,n+1) = t\_pwm/N \quad (1)$$

where n=1 to N (where N is an integer of two or more, and n+1=1 when n+1>N), and t_pwm is a cycle of the PWM signals.

$$Ia\_all = \sum_{n=1}^{N} Ia(n) \quad (2)$$

$$\Delta t\_shift(n, n+1) = t\_pwm \times Ia(n) / Ia\_all$$

where n=1 to N (where N is an integer of two or more, n+1=1 when n+1>N), t_pwm is a cycle of the PWM signals, and Ia(n) is an effective current flowing to each of the N motors M_1 to M_N.

$$Va\_all = \sum_{n=1}^{N} Va(n) \quad (3)$$

$$\Delta t\_shift(n, n+1) = t\_pwm \times Va(n) / Va\_all$$

where n=1 to N (where N is an integer of two or more, and n+1=1 when n+1>N), t_pwm is a cycle of the PWM signals, and Va(n) is an effective voltage fed to each of the N motors M_1 to M_N.

$$Pa(n) = Ia(n) \times Va(n) \quad (4)$$

$$Pa\_all = \sum_{n=1}^{N} Pa(n)$$

$$\Delta t\_shift(n, n+1) = t\_pwm \times Pa(n) / Pa\_all$$

where n=1 to N (where N is an integer of two or more, n+1=1 when n+1>N), t_pwm is a cycle of the PWM signals, and Pa(n) is an effective electric power consumed by each of the N motors M_1 to M_N.

Figure 7:
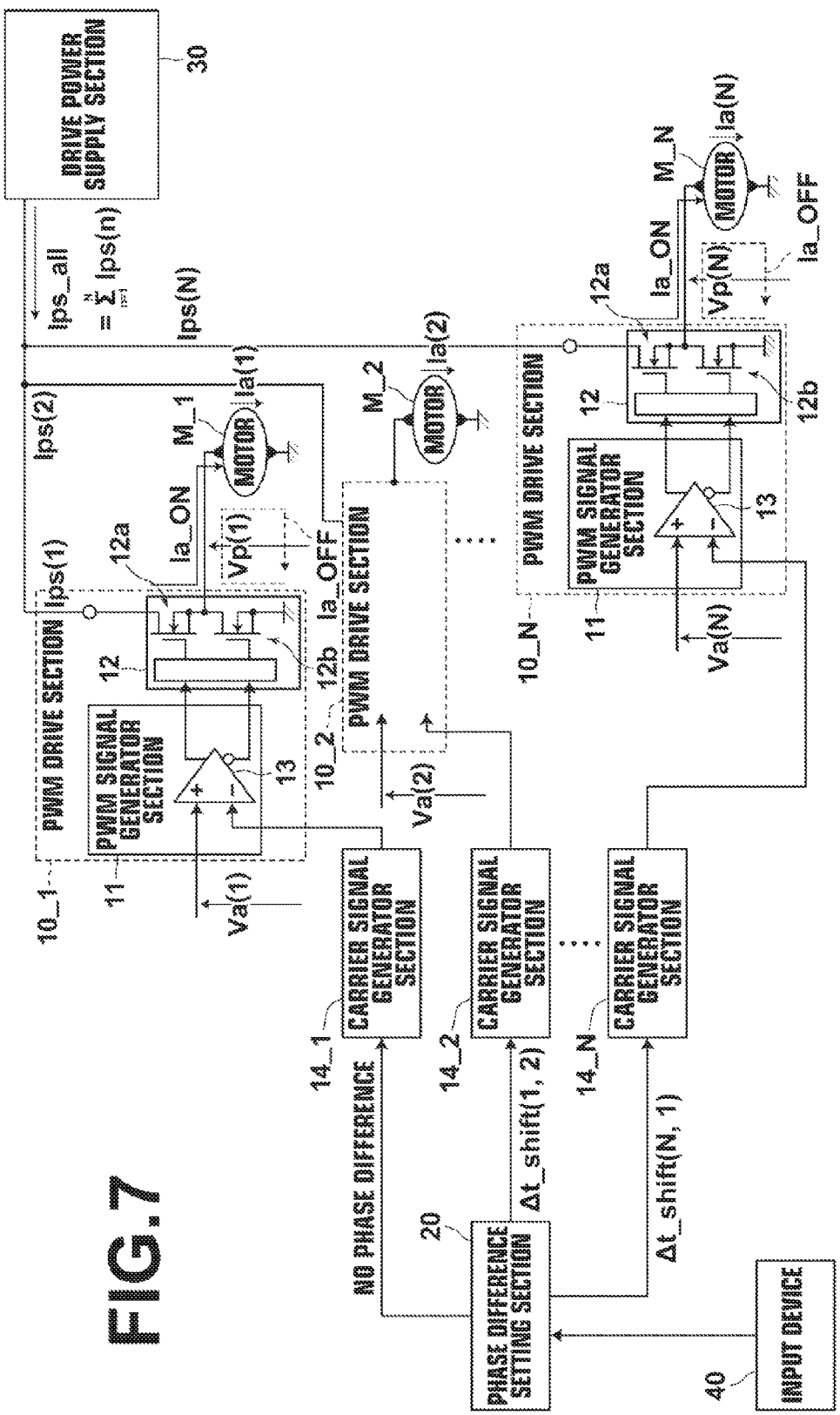
FIG. 7 is a diagram illustrating the schematic configuration of a motor drive control device that employs a fourth embodiment of the drive control device of the invention.

Switching among the sets of phase differences Δt_shift(n,n+1) calculated according to the equations (1) to (4) above may be achieved, for example, by the user setting and inputting the phase differences Δt_shift(n,n+1) that are calculated based on one of the conditional equations via an input device 40 shown in FIG. 7.

Further, in place of directly inputting the phase differences Δt_shift(n,n+1) via the input device 40 as described above, the four sets of phase differences Δt_shift(n,n+1) calculated according to the equations (1) to (4) above may be set in advance at the phase difference setting section 20, for example, and the user may input a signal for selecting one of the four sets of phase differences Δt_shift(n,n+1) set in advance via the input device 40. Then, in response to the input, the phase difference setting section 20 may set the selected phase differences Δt_shift(n,n+1). The selection of one of the four sets of phase differences Δt_shift(n,n+1) set in advance may be achieved, for example, by providing four selection switches at the input device 40 or via a selection screen displayed on a touch panel serving as the input device 40.

In the above-described motor drive control devices of the first to fourth embodiments, the phase differences of the PWM signals fed to the motors are set based on the effective current, the effective voltage or the effective electric power of each motor. Now, examples of simulations of the ripple currents in different cases where the effective current, the effective voltage or the effective electric power of each motor is calculated with assuming a rotation speed and a load torque required for each motor, and the four sets of phase differences are calculated according to the equations (1) to (4) above and are respectively set are described.

Figure 8:
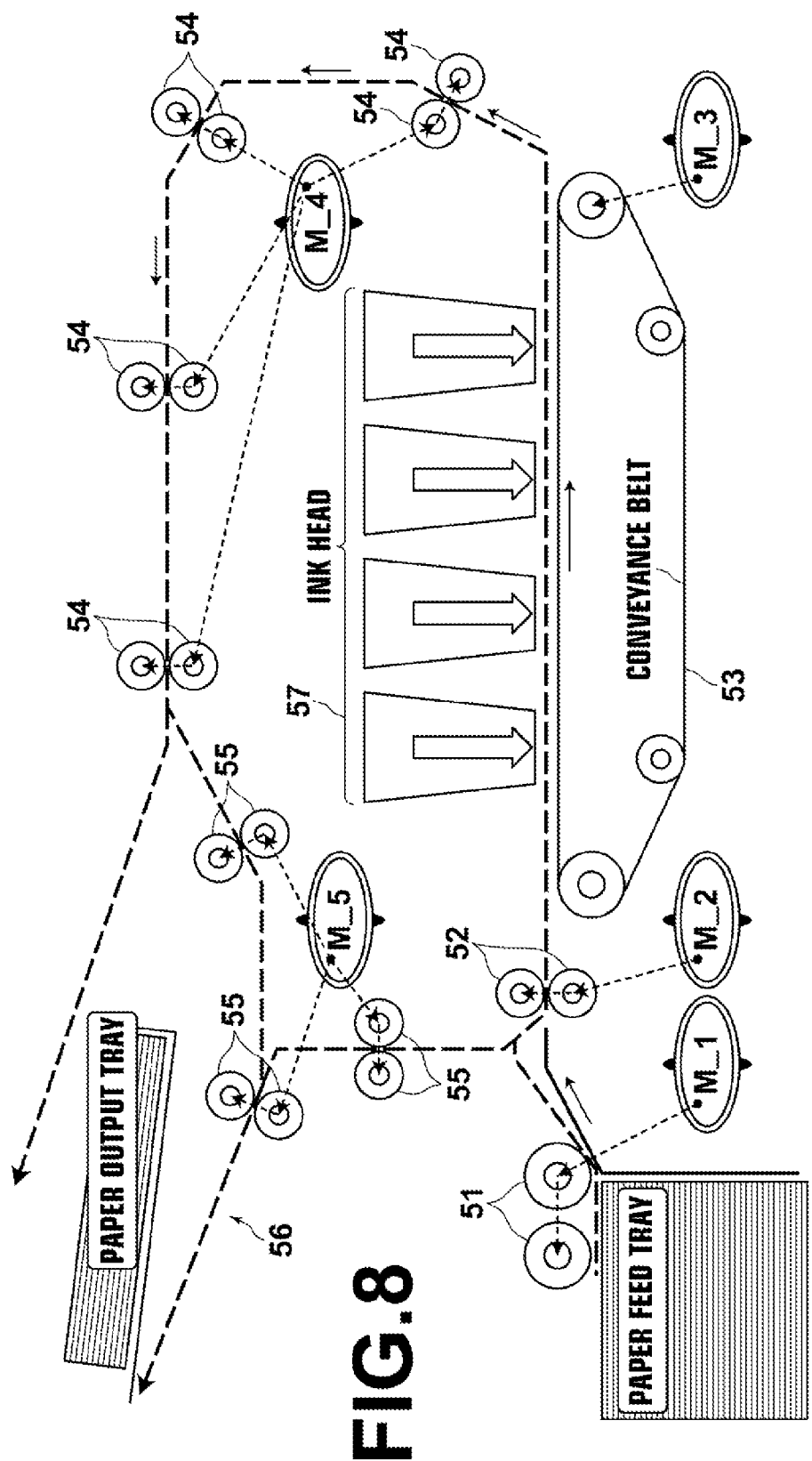
FIG. 8 is a diagram illustrating the schematic configuration of an inkjet printer having a paper transport system including a plurality of DC motors.

First, as a plurality of motors, five motors M_1 to M_5 used in a paper transport system of an inkjet printer as shown in FIG. 8 are assumed.

The inkjet printer shown in FIG. 8 is briefly described. The inkjet printer shown in FIG. 8 is capable of duplex printing. In the inkjet printer shown in FIG. 8, each printing paper sheet is fed from a paper feed tray by pickup rollers 51, paper skew is corrected by register rollers 52, and the printing paper sheet is conveyed by the register rollers 52 and a conveyance belt 53 to pass under an ink head 57. When duplex printing is performed, a printing paper sheet with one face thereof having subjected to printing is further conveyed to a conveyance path above and is conveyed by conveyance rollers 54 to an inverting conveyance path 56. Then, the printing paper sheet conveyed by conveyance rollers 55 is inverted at the inverting conveyance path 56, is conveyed again to pass under the ink head 57, and is conveyed by the conveyance rollers 54 to a paper output tray.

The motor M_1 is a primary paper feed drive motor for driving the pickup rollers 51, the motor M_2 is a secondary paper feed drive motor for driving the register rollers 52, the motor M_3 is a belt platen motor for driving platen rollers that convey the conveyance belt 53, the motor M_4 drives the conveyance rollers 54, and the motor M_5 drives the conveyance rollers 55.

The examples described here are simulations of four cases (Case1 to Case4) where different rotation speeds and load torques are required for the motors M_1 to M_5. The table shown in FIG. 9 shows results of the simulations of the four cases Case1 to Case4, where required values of the rotation speed and the load torque of each of the motors M_1 to M_5, simulation values of the effective current, the effective voltage and the effective electric power of each of the motors M_1 to M_5, and phase distributions when the sets of phase differences calculated based on the effective current, the effective voltage and the effective electric power according to the equations (2) to (4) above are respectively applied in the cases Case1 to Case4. It should be noted that, as shown in the lowermost row of the table shown in FIG. 9, when the phase distribution is performed based on the number of motors, 20% is allocated to each motor in all the cases Case1 to Case4.

Next, the cases Case1 to Case4 are specifically described. The Case1 is a case where the motors M_1 to M_5 have different rotational speeds and the maximum rotational speed is three times the minimum rotational speed. The Case2 is a case where the motors M_1 to M_5 have different load torques and the maximum load torque is three times the minimum load torque. In the Case3, the rotational speeds of the motors M_1 to M_5 are the same as those in the Case2 and the load torques of the motors M_1 to M_5 increase in the opposite direction from that in the Case2. That is, while the load torques of the motors in the Case2 gradually decrease from the most upstream motor M_1 to the most downstream motor M_5, the load torques of the motors in the Case3 gradually increase from the most upstream motor M_1 to the most downstream motor M_5. In the Case4, the rotational speeds of the motors M_1 to M_5 are the same as those in the Case1 and the load torques of the motors M_1 to M_5 increase in the opposite direction from that in the Case2. That is, in the Case4, the most upstream motor M_1 has the lowest speed and the highest load and the most downstream motor M_5 has the highest speed and the lowest load.

FIG. 10 shows, at "a" to "d", results of simulations of the PWM signals and the ripple currents in the Case1. Specifically, FIG. 10 shows voltage waveforms of the PWM signals and waveforms of the ripple currents of the motors M_1 to M_5 when the phase differences are set based on the number of motors at "a", voltage waveforms of the PWM signals and waveforms of the ripple currents of the motors M_1 to M_5 when the phase differences are set based on the effective currents of the motors M_1 to M_5 at "b", voltage waveforms of the PWM signals and waveforms of the ripple currents of the motors M_1 to M_5 when the phase differences are set based on the effective voltages of the motors M_1 to M_5 at "c", and voltage waveforms of the PWM signals and waveforms of the ripple currents of the motors M_1 to M_5 when the phase differences are set based on the effective electric powers of the motors M_1 to M_5 at "d".

Figure 11:
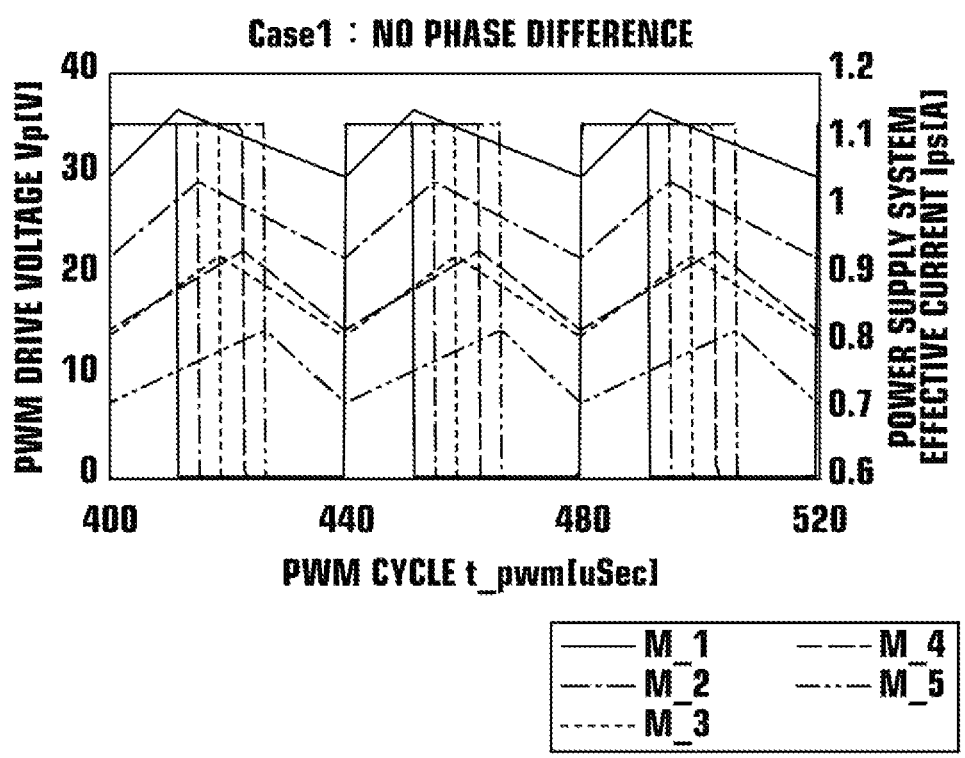
FIG. 11 shows voltage waveforms of PWM signals and waveforms of ripple currents when no phase difference is set among PWM signals in the Case1.

FIG. 11 shows voltage waveforms of the PWM signals and waveforms of the ripple currents when no phase difference is set among the PWM signals.

Figure 12:
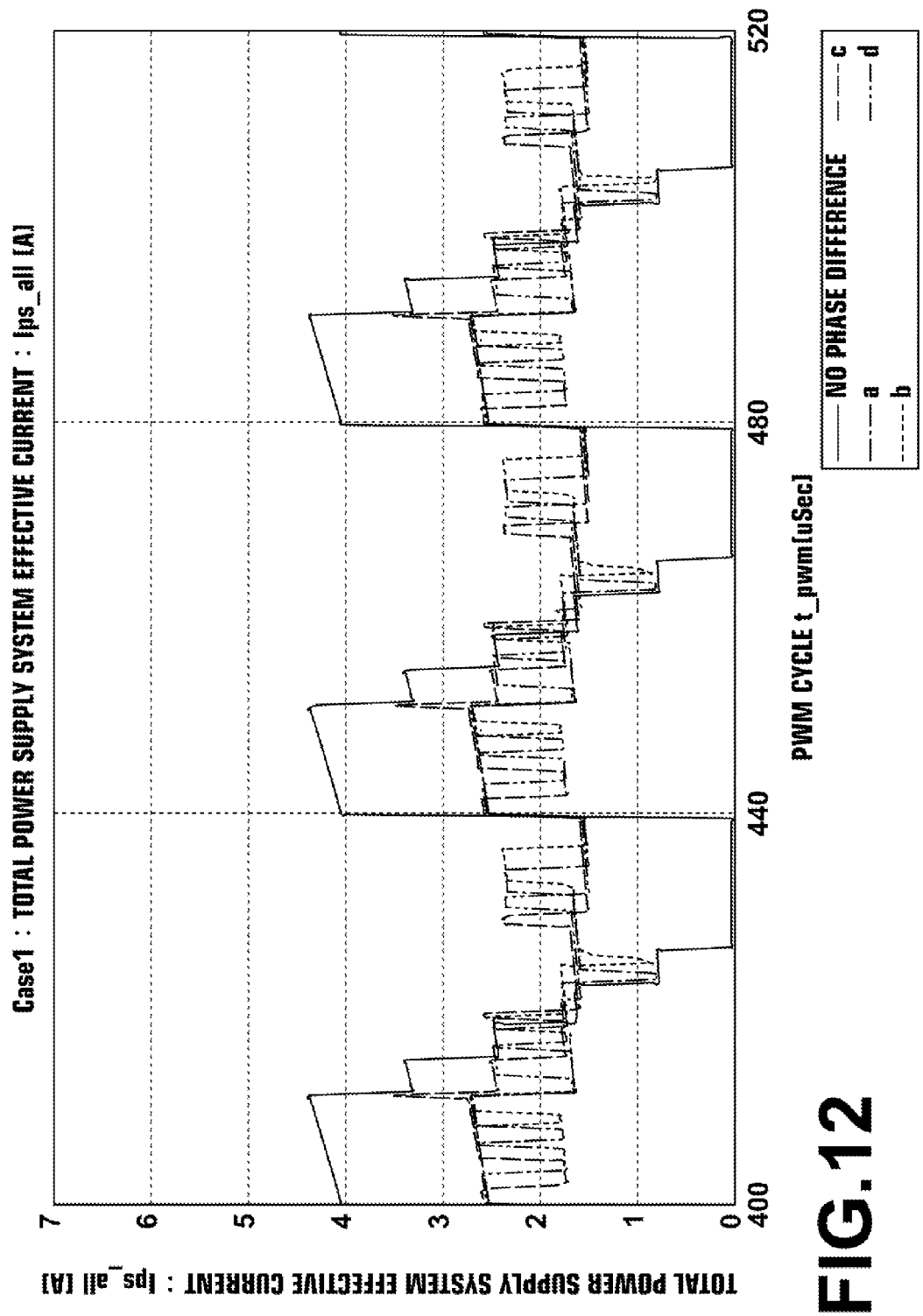
FIG. 12 is a graph showing a total value of effective current values of all the motors M_1 to M_5 in each of the cases shown at "a" to "d" in FIG. 10 and in FIG. 11.

Further, FIG. 12 shows results of calculated total values of power supply system effective current values when all the motors M_1 to M_5 are driven, i.e., results of total values of the ripple currents, in the individual cases where the phase differences are set based on the number of motors (the case shown at "a" in FIG. 10), where the phase differences are set based on the effective currents of the motors M_1 to M_5 (the case shown at "b" in FIG. 10), where the phase differences are set based on the effective voltages of the motors M_1 to M_5 (the case shown at "c" in FIG. 10), where the phase differences are set based on the effective electric powers of the motors M_1 to M_5 (the case shown at "d" in FIG. 10), and where no phase difference is set (the case shown in FIG. 11). The symbol "a" shown in FIG. 12 denotes a total value of the power supply system effective current values when all the motors M_1 to M_5 are driven in the case shown at "a" in FIG. 10, the symbol "b" shown in FIG. 12 denotes a total value of the power supply system effective current values when all the motors M_1 to M_5 are driven in the case shown at "b" in FIG. 10, the symbol "c" shown in FIG. 12 denotes a total value of the power supply system effective current values when all the motors M_1 to M_5 are driven in the case shown at "c" in FIG. 10, the symbol "d" shown in FIG. 12 denotes a total value of the power supply system effective current values when all the motors M_1 to M_5 are driven in the case shown at "d" in FIG. 10, and "NO PHASE DIFFERENCE" shown in FIG. 12 denotes a total value of the power supply system effective current values when all the motors M_1 to M_5 are driven in the case shown in FIG. 11.

As can be seen from FIG. 12, the peak-to-bottom value of the waveform of the total value of the effective currents is the smallest in the case denoted by the symbol "b" shown in FIG. 12 (the case shown at "b" in FIG. 10), namely, in the case where the phase differences are set based on the effective currents, and therefore the phase differences in this case are deemed to be most suitable. Therefore, the user may select and set these phase differences.

Figure 13:
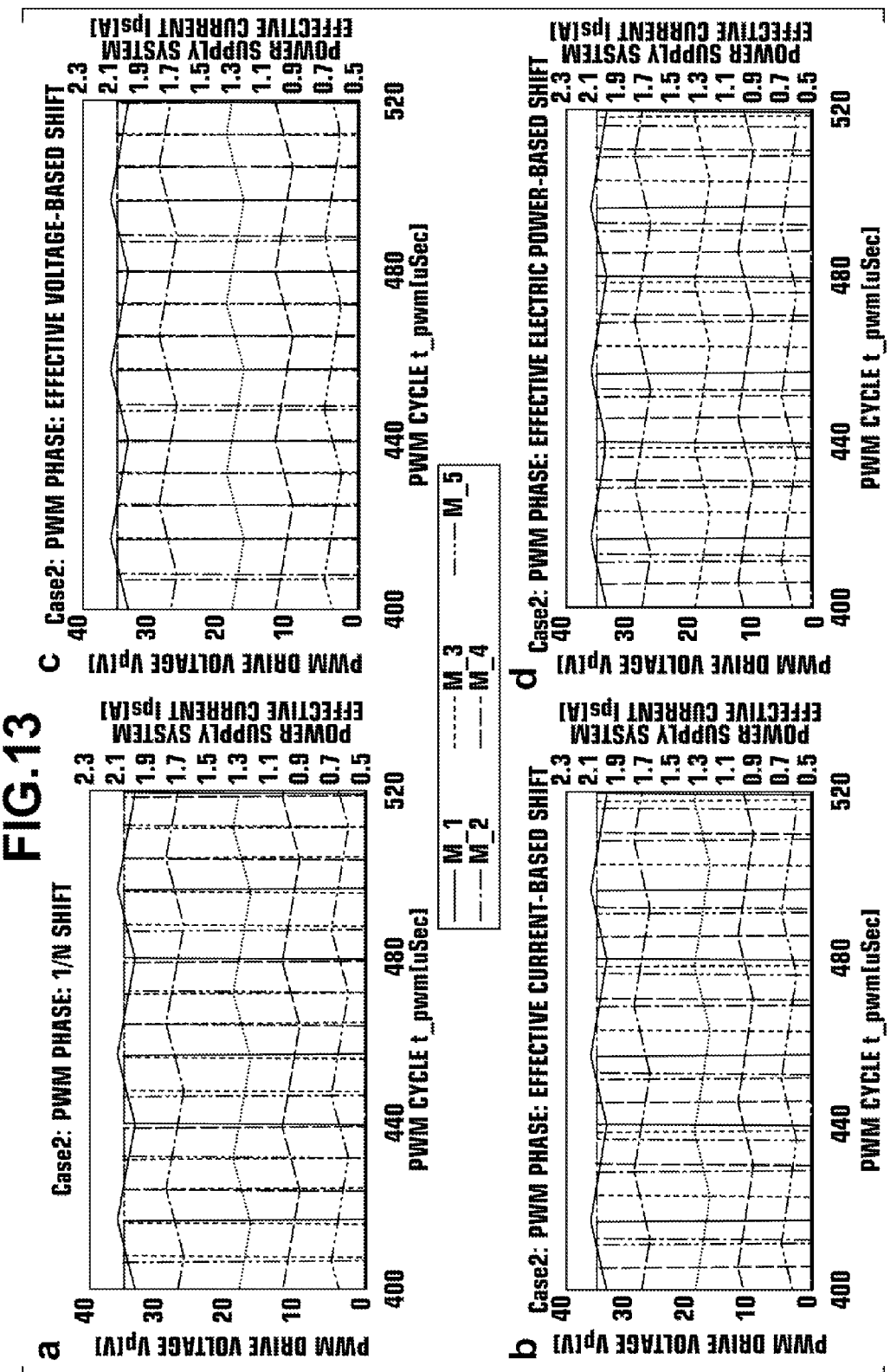
FIG. 13 shows voltage waveforms of PWM signals and waveforms of ripple currents when phase differences are set based on the number of motors in the Case2 at "a", voltage waveforms of PWM signals and waveforms of ripple currents when phase differences are set based on effective currents of the motors M_1 to M_5 in the Case2 at "b", voltage waveforms of PWM signals and waveforms of ripple currents when phase differences are set based on effective voltages of the motors M_1 to M_5 in the Case2 at "c", and voltage waveforms of PWM signals and waveforms of ripple currents when phase differences are set based on effective electric powers of the motors M_1 to M_5 in the Case2 at "d"

FIG. 13 shows, at "a" to "d", results of simulations of the PWM signals and the ripple currents in the Case2. Specifically, FIG. 13 shows voltage waveforms of the PWM signals and waveforms of the ripple currents of the motors M_1 to M_5 when the phase differences are set based on the number of motors at "a", voltage waveforms of the PWM signals and waveforms of the ripple currents of the motors M_1 to M_5 when the phase differences are set based on the effective currents of the motors M_1 to M_5 at "b", voltage waveforms of the PWM signals and waveforms of the ripple currents of the motors M_1 to M_5 when the phase differences are set based on the effective voltages of the motors M_1 to M_5 at "c", and voltage waveforms of the PWM signals and waveforms of the ripple currents of the motors M_1 to M_5 when the phase differences are set based on the effective electric powers of the motors M_1 to M_5 at "d".

Figure 14:
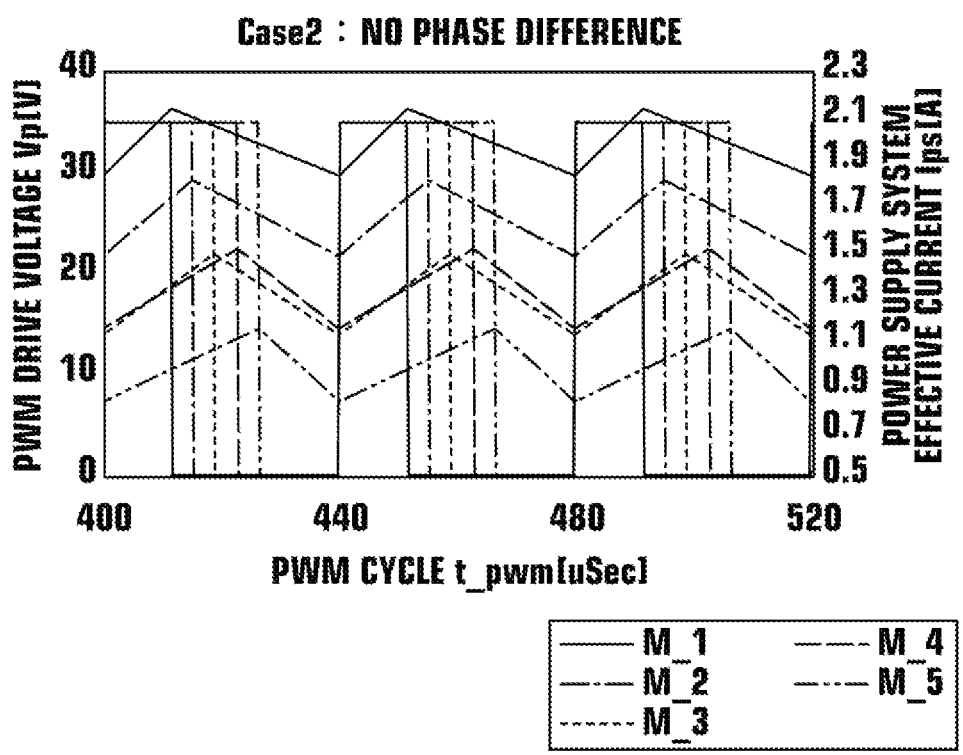
FIG. 14 shows voltage waveforms of PWM signals and waveforms of ripple currents when no phase difference is set among PWM signals in the Case2.

FIG. 14 shows voltage waveforms of the PWM signals and waveforms of the ripple currents when no phase difference is set among the PWM signals.

Figure 15:
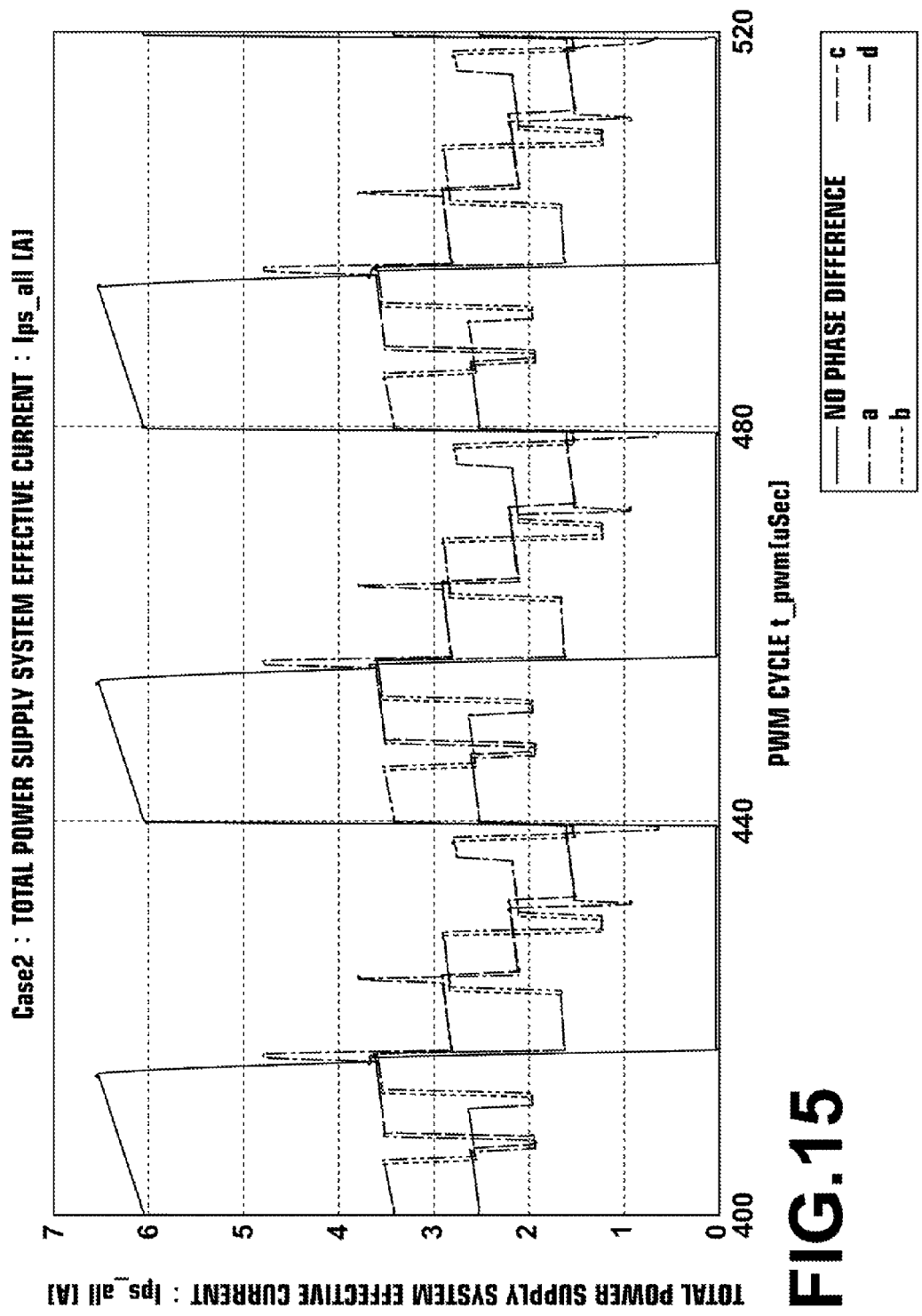
FIG. 15 is a graph showing a total value of effective current values of all the motors M_1 to M_5 in each of the cases shown at "a" to "d" in FIG. 13 and in FIG. 14.

Further, FIG. 15 shows results of calculated total values of power supply system effective current values when all the motors M_1 to M_5 are driven in the individual cases where the phase differences are set based on the number of motors (the case shown at "a" in FIG. 13), where the phase differences are set based on the effective currents of the motors M_1 to M_5 (the case shown at "b" in FIG. 13), where the phase differences are set based on the effective voltages of the motors M_1 to M_5 (the case shown at "c" in FIG. 13), where the phase differences are set based on the effective electric powers of the motors M_1 to M_5 (the case shown at "d" in FIG. 13), and where no phase difference is set (the case shown in FIG. 14). The symbol "a" shown in FIG. 15 denotes a total value of the power supply system effective current values when all the motors M_1 to M_5 are driven in the case shown at "a" in FIG. 13, the symbol "b" shown in FIG. 15 denotes a total value of the power supply system effective current values when all the motors M_1 to M_5 are driven in the case shown at "b" in FIG. 13, the symbol "c" shown in FIG. 15 denotes a total value of the power supply system effective current values when all the motors M_1 to M_5 are driven in the case shown at "c" in FIG. 13, the symbol "d" shown in FIG. 15 denotes a total value of the power supply system effective current values when all the motors M_1 to M_5 are driven in the case shown at "d" in FIG. 13, and "NO PHASE DIFFERENCE" shown in FIG. 13 denotes a total value of the power supply system effective current values when all the motors M_1 to M_5 are driven in the case shown in FIG. 14.

As can be seen from FIG. 15, the peak-to-bottom value of the waveform of the total value of the effective currents is the smallest in the case denoted by the symbol "c" shown in FIG. 15 (the case shown at "c" in FIG. 13), namely, in the case where the phase differences are set based on the effective voltages, and therefore the phase differences in this case are deemed to be most suitable. Therefore, the user may select and set these phase differences.

Figure 16:
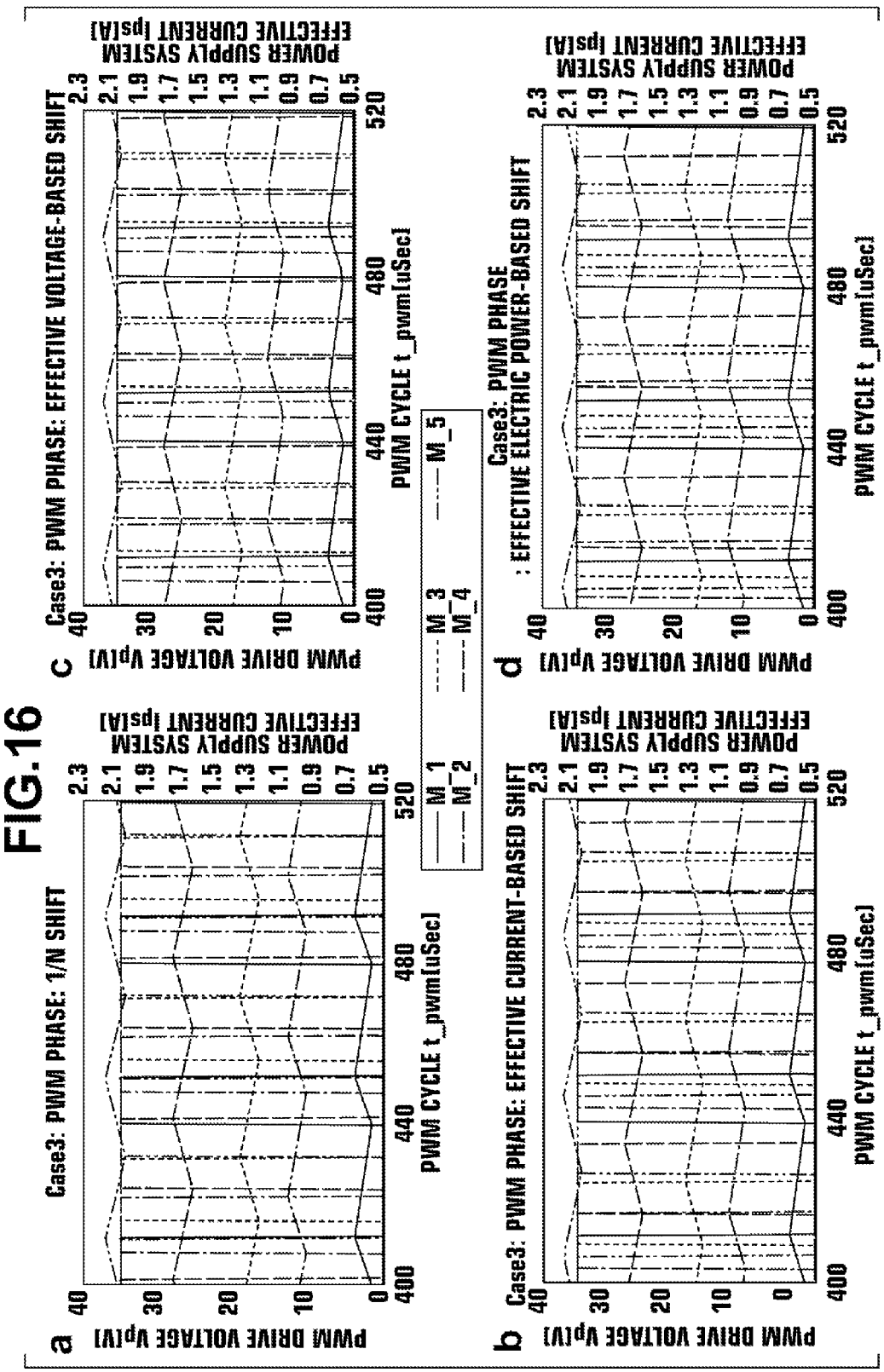
FIG. 16 shows voltage waveforms of PWM signals and waveforms of ripple currents when phase differences are set based on the number of motors in the Case3 at "a", voltage waveforms of PWM signals and waveforms of ripple currents when phase differences are set based on effective currents of the motors M_1 to M_5 in the Case3 at "b", voltage waveforms of PWM signals and waveforms of ripple currents when phase differences are set based on effective voltages of the motors M_1 to M_5 in the Case3 at "c", and voltage waveforms of PWM signals and waveforms of ripple currents when phase differences are set based on effective electric powers of the motors M_1 to M_5 in the Case3 at "d"

FIG. 16 shows, at "a" to "d", results of simulations of the PWM signals and the ripple currents in the Case3. Specifically, FIG. 16 shows voltage waveforms of the PWM signals and waveforms of the ripple currents of the motors M_1 to M_5 when the phase differences are set based on the number of motors at "a", voltage waveforms of the PWM signals and waveforms of the ripple currents of the motors M_1 to M_5 when the phase differences are set based on the effective currents of the motors M_1 to M_5 at "b", voltage waveforms of the PWM signals and waveforms of the ripple currents of the motors M_1 to M_5 when the phase differences are set based on the effective voltages of the motors M_1 to M_5 at "c", and voltage waveforms of the PWM signals and waveforms of the ripple currents of the motors M_1 to M_5 when the phase differences are set based on the effective electric powers of the motors M_1 to M_5 at "d".

Figure 17:
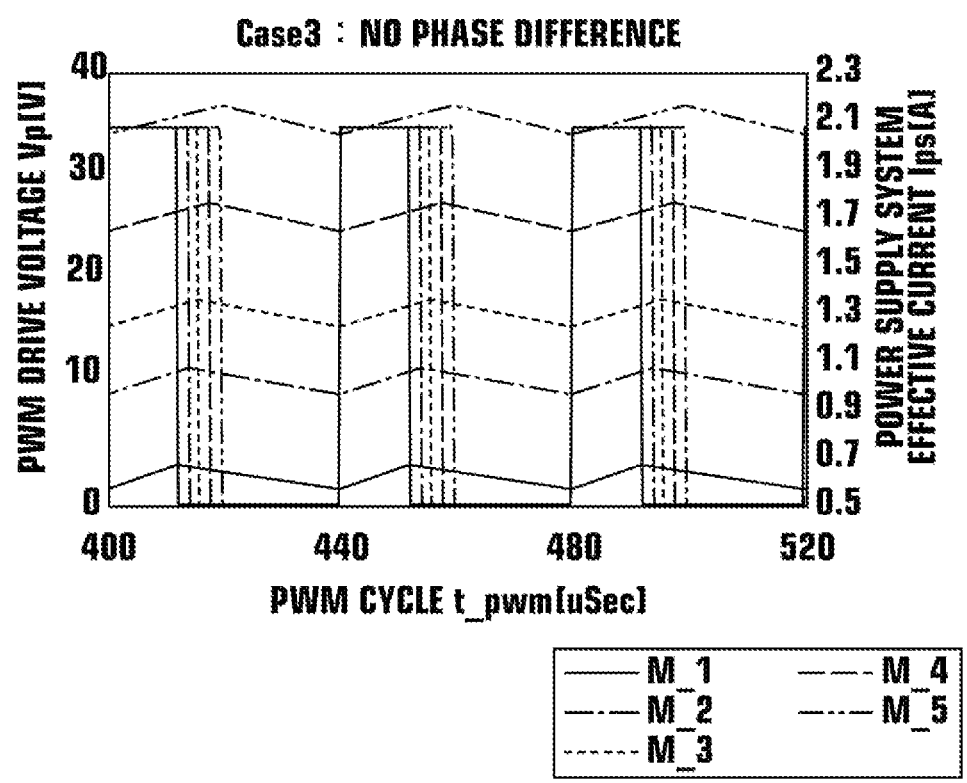
FIG. 17 shows voltage waveforms of PWM signals and waveforms of ripple currents when no phase difference is set among PWM signals in the Case3.

FIG. 17 shows voltage waveforms of the PWM signals and waveforms of the ripple currents when no phase difference is set among the PWM signals.

Figure 18:
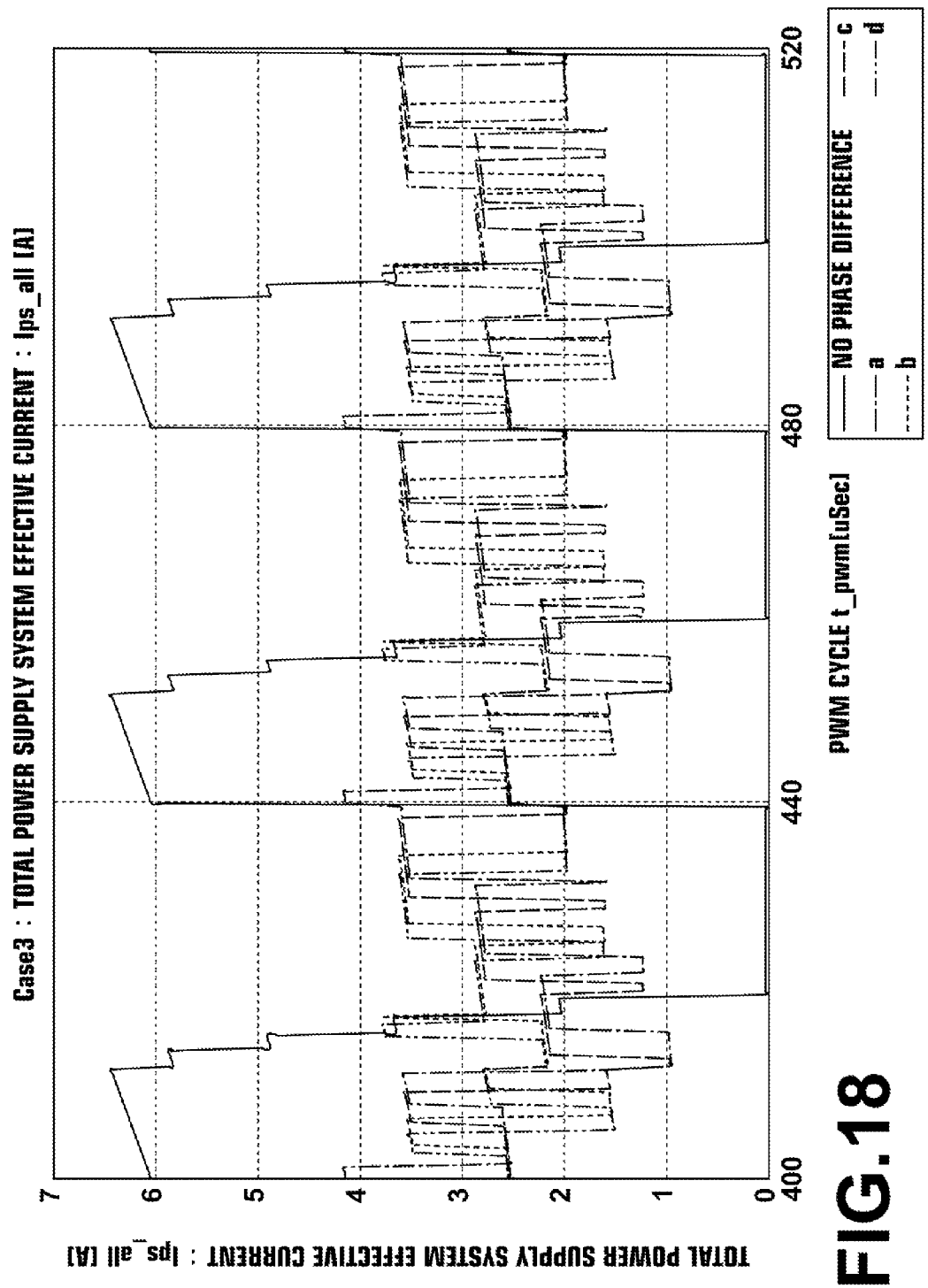
FIG. 18 is a graph showing a total value of effective current values of all the motors M_1 to M_5 in each of the cases shown at "a" to "d" in FIG. 16 and in FIG. 17.

Further, FIG. 18 shows results of calculated total values of power supply system effective current values when all the motors M_1 to M_5 are driven in the individual cases where the phase differences are set based on the number of motors (the case shown at "a" in FIG. 16), where the phase differences are set based on the effective currents of the motors M_1 to M_5 (the case shown at "b" in FIG. 16), where the phase differences are set based on the effective voltages of the motors M_1 to M_5 (the case shown at "c" in FIG. 16), where the phase differences are set based on the effective electric powers of the motors M_1 to M_5 (the case shown at "d" in FIG. 16), and where no phase difference is set (the case shown in FIG. 17). The symbol "a" shown in FIG. 18 denotes a total value of the power supply system effective current values when all the motors M_1 to M_5 are driven in the case shown at "a" in FIG. 16, the symbol "b" shown in FIG. 18 denotes a total value of the power supply system effective current values when all the motors M_1 to M_5 are driven in the case shown at "b" in FIG. 16, the symbol "c" shown in FIG. 18 denotes a total value of the power supply system effective current values when all the motors M_1 to M_5 are driven in the case shown at "c" in FIG. 16, the symbol "d" shown in FIG. 18 denotes a total value of the power supply system effective current values when all the motors M_1 to M_5 are driven in the case shown at "d" in FIG. 16, and "NO PHASE DIFFERENCE" shown in FIG. 18 denotes a total value of the power supply system effective current values when all the motors M_1 to M_5 are driven in the case shown in FIG. 17.

As can be seen from FIG. 18, the peak-to-bottom value of the waveform of the total value of the effective currents is the smallest in the case denoted by the symbol "c" shown in FIG. 18 (the case shown at "c" in FIG. 16), namely, in the case where the phase differences are set based on the effective voltages, and therefore the phase differences in this case are deemed to be most suitable. Therefore, the user may select and set these phase differences.

Figure 19:
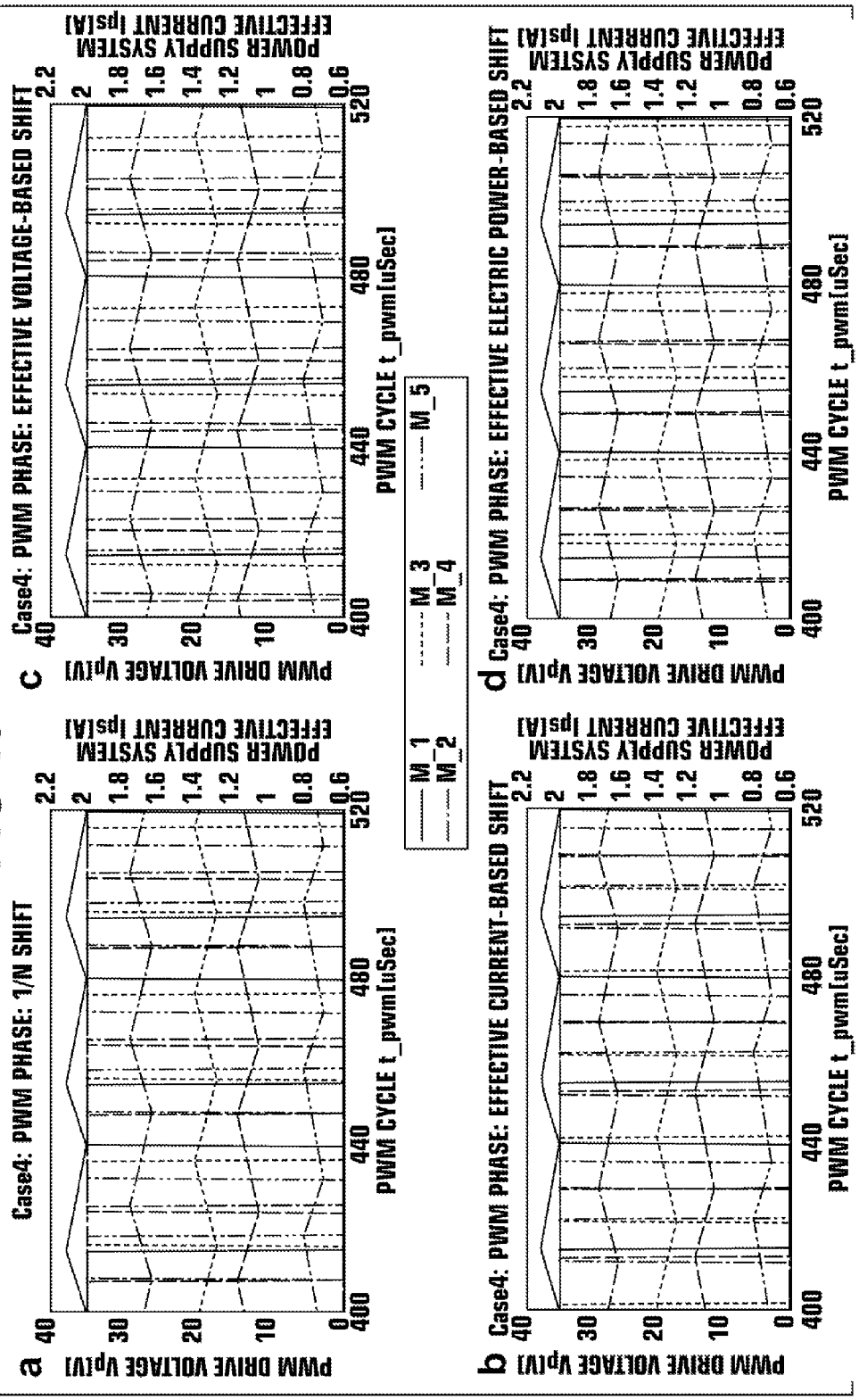
FIG. 19 shows voltage waveforms of PWM signals and waveforms of ripple currents when phase differences are set based on the number of motors in the Case4 at "a", voltage waveforms of PWM signals and waveforms of ripple currents when phase differences are set based on effective currents of the motors M_1 to M_5 in the Case4 at "b", voltage waveforms of PWM signals and waveforms of ripple currents when phase differences are set based on effective voltages of the motors M_1 to M_5 in the Case4 at "c", and voltage waveforms of PWM signals and waveforms of ripple currents when phase differences are set based on effective electric powers of the motors M_1 to M_5 in the Case4 at "d"

FIG. 19 shows, at "a" to "d", results of simulations of the PWM signals and the ripple currents in the Case4. Specifically, FIG. 19 shows voltage waveforms of the PWM signals and waveforms of the ripple currents of the motors M_1 to M_5 when the phase differences are set based on the number of motors at "a", voltage waveforms of the PWM signals and waveforms of the ripple currents of the motors M_1 to M_5 when the phase differences are set based on the effective currents of the motors M_1 to M_5 at "b", voltage waveforms of the PWM signals and waveforms of the ripple currents of the motors M_1 to M_5 when the phase differences are set based on the effective voltages of the motors M_1 to M_5 at "c", and voltage waveforms of the PWM signals and waveforms of the ripple currents of the motors M_1 to M_5 when the phase differences are set based on the effective electric powers of the motors M_1 to M_5 at "d".

Figure 20:
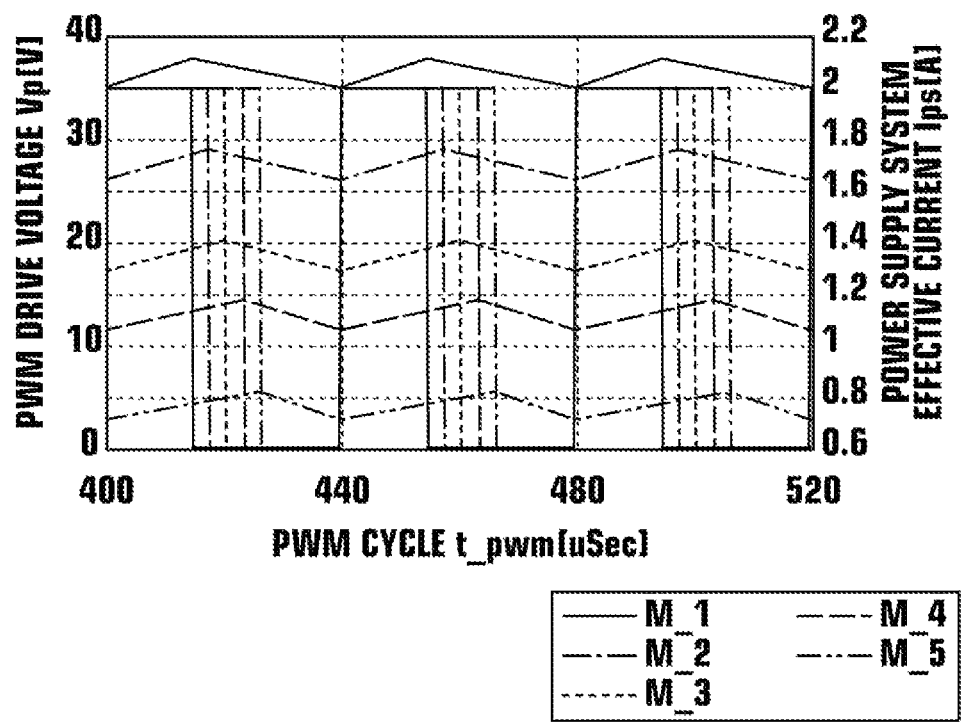
FIG. 20 shows voltage waveforms of PWM signals and waveforms of ripple currents when no phase difference is set among PWM signals in the Case4.

FIG. 20 shows voltage waveforms of PWM signals and waveforms of ripple currents when no phase difference is set among PWM signals.

Figure 21:
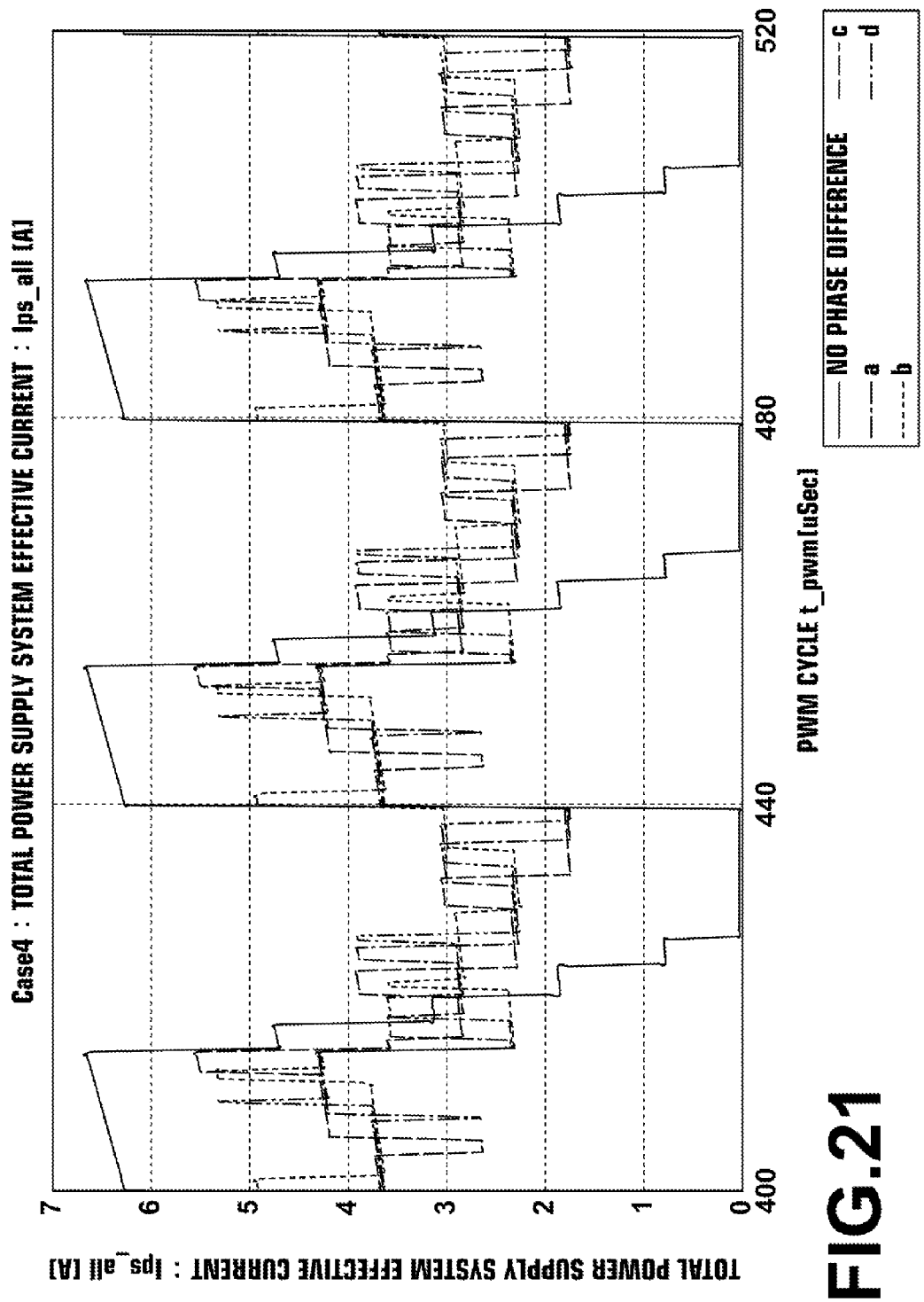
FIG. 21 is a graph showing a total value of effective current values of all the motors M_1 to M_5 in each of the cases shown at "a" to "d" in FIG. 19 and in FIG. 20.

Further, FIG. 21 shows results of calculated total values of power supply system effective current values when all the motors M_1 to M_5 are driven in the individual cases where the phase differences are set based on the number of motors (the case shown at "a" in FIG. 19), where the phase differences are set based on the effective currents of the motors M_1 to M_5 (the case shown at "b" in FIG. 19), where the phase differences are set based on the effective voltages of the motors M_1 to M_5 (the case shown at "c" in FIG. 19), where the phase differences are set based on the effective electric powers of the motors M_1 to M_5 (the case shown at "d" in FIG. 19), and where no phase difference is set (the case shown in FIG. 20). The symbol "a" shown in FIG. 21 denotes a total value of the power supply system effective current values when all the motors M_1 to M_5 are driven in the case shown at "a" in FIG. 19, the symbol "b" shown in FIG. 21 denotes a total value of the power supply system effective current values when all the motors M_1 to M_5 are driven in the case shown at "b" in FIG. 19, the symbol "c" shown in FIG. 21 denotes a total value of the power supply system effective current values when all the motors M_1 to M_5 are driven in the case shown at "c" in FIG. 19, the symbol "d" shown in FIG. 21 denotes a total value of the power supply system effective current values when all the motors M_1 to M_5 are driven in the case shown at "d" in FIG. 19, and "NO PHASE DIFFERENCE" shown in FIG. 21 denotes a total value of the power supply system effective current values when all the motors M_1 to M_5 are driven in the case shown in FIG. 20.

As can be seen from FIG. 21, the peak-to-bottom value of the waveform of the total value of the effective currents is the smallest in the case denoted by the symbol "d" shown in FIG. 21 (the case shown at "d" in FIG. 19), namely, in the case where the phase differences are set based on the effective electric powers, and therefore the phase differences in this case are deemed to be most suitable. Therefore, the user may select and set these phase differences.

Further, while the user selects and sets the phase differences that achieve the smallest total value of the ripple currents at the phase difference setting section 20 in the motor drive control device of the fourth embodiment, the phase difference setting section 20 may automatically select and set the most suitable phase differences.

Figure 22:
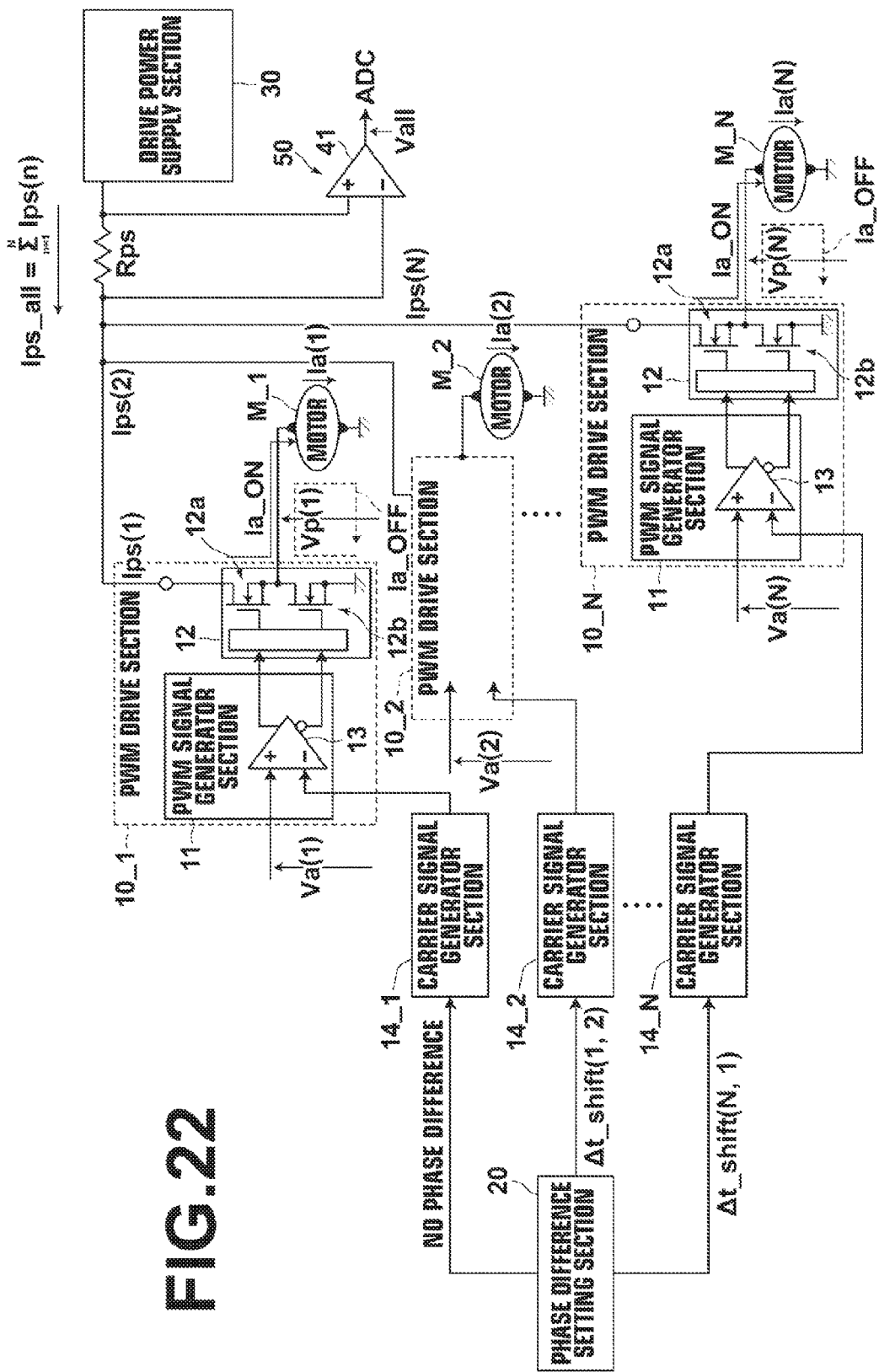
FIG. 22 is a diagram illustrating the schematic configuration of a motor drive control device that employs a modification of the fourth embodiment of the drive control device of the invention.

Specifically, the sets of phase differences Δt_shift(n,n+1) calculated based on the above-described equations (1) to (4) may be set in advance at the phase difference setting section 20, and a current measurement section 50 that actually measures a total value Ips_all of the power supply system effective currents Ips(1) to Ips(N) may be provided, as shown in FIG. 22, to measure a total value Ips_all of the power supply system effective currents in each of the cases where the sets of phase differences calculated according to the equations (1) to (4) above are respectively set, and the set of phase differences that achieves the minimum measured total value ΣIps(n) may be automatically selected and set.

The current measurement section 50 includes a resistive element Rps connected to the output terminal of the drive power supply section 30, and a current detection amplifier 41 connected to the resistive element Rps. A measured voltage Vall outputted from the current detection amplifier 41 is outputted to an ADC (A/D converter) to be converted into a digital signal. Then, based on the signal, the total value Ips_all is calculated according to the equation below:

$V\text{all}=Rps \cdot Ips\_\text{all} \cdot \beta$, and hence $Ips\_\text{all}=V\text{all}/(Rps \cdot \beta)$, where $\beta$ is a gain of the current detection amplifier 41.

Further, after drive conditions, such as an operation pattern and a load pattern, of the individual motors M_1 to M_N are determined, the effective currents Ia(1) to Ia(n), the effective voltages Va(1) to Va(n) and the power supply system drive currents Ips(1) to Ips(N) (the drive currents Ia_ON) of the individual motors M_1 to M_N can be calculated. Therefore, for example, input of settings of the drive conditions of the individual motors M_1 to M_N may be received. Then, based on the inputted drive conditions, the effective currents Ia(1) to Ia(n) and the effective voltages Va(1) to Va(n) of the motors M_1 to M_N may be calculated, and the sets of phase differences according to the equations (1) to (4) above may be calculated based on the effective currents Ia(1) to Ia(n) and the effective voltages Va(1) to Va(n). Then, the total value Ips_all of the power supply system effective currents in each of the cases where the calculated sets of phase differences are respectively set may be calculated, and the set of phase differences that achieves the minimum total value Ips_all may be automatically selected and set.

Further, for example, in the case where the motors M_1 to M_N are used in the inkjet printer as shown in FIG. 8, the drive conditions of the motors M_1 to M_N are determined depending on the size of a printing paper sheet to be conveyed. As described above, after the drive conditions of the individual motors M_1 to M_N are determined, the set of the phase differences that achieves the minimum total value Ips_all can be found. To this end, a table that associates each paper size with the most suitable one of the sets of phase differences according to the equations (1) to (4) above may be set in advance, and the table may be referenced based on the inputted setting of the paper size to automatically set the most suitable set of phase differences to convey a printing paper sheet of the paper size by the motors M_1 to M_N.

Further, while the total values Ips_all of the power supply system drive currents are measured by the current measurement section 50 and the most suitable set of phase differences is automatically set based on the result of the measurement in the above description, the user may measure, with a current probe, or the like, the total value Ips_all of the power supply system drive currents in each of the cases where the sets of phase differences calculated according to the equations (1) to (4) above are respectively set, and the user may set the most suitable set of phase difference based on the result of measurement.

Further, while one of the sets of phase differences calculated based on the four equations (1) to (4) above is selected in the motor drive control device of the fourth embodiment, it is not necessary to use all of the four sets of phase differences, and one of the sets of phase differences calculated according to at least two of the equations (1) to (4) above may be selected.

Further, while the loads to be subject to the drive control using PWM signals are motors in the above-described embodiments, the loads to be subject to the drive control of the invention are not limited to motors. The present invention is also applicable to drive control of a plurality of solenoids using PWM signals, for example.

What is claimed is:

1. A drive control device for performing drive control of a plurality of loads based on PWM signals, the device comprising:
    a PWM signal generator section for generating the PWM signals with different phases to be respectively fed to the loads; and
    a phase difference setting section for setting phase differences among the PWM signals,
    wherein the phase difference setting section sets phase differences $\Delta t\_shift(n,n+1)$ calculated based on an effective current $Ia(n)$ flowing to each of the loads, where the number of the loads is N, according to the equations below:

$$Ia\_all = \sum_{n=1}^{N} Ia(n)$$

$$\Delta t\_shift(n, n+1) = t\_pwm \times Ia(n)/Ia\_all$$

where n=1 to N, N is an integer of two or more, n+1=1 when n+1>N, and t_pwm is a cycle of the PWM signals, and
    wherein the effective current is an effective value (root mean square) of alternate current that flows to a load.

2. A drive control device for performing drive control of a plurality of loads based on PWM signals, the device comprising:
    a PWM signal generator section for generating the PWM signals with different phases to be respectively fed to the loads; and
    a phase difference setting section for setting phase differences among the PWM signals,
    wherein the phase difference setting section sets phase differences $\Delta t\_shift(n,n+1)$ calculated based on an effective voltage $Va(n)$ fed to each of the loads, where the number of the loads is N, according to the equations below:

$$Va\_all = \sum_{n=1}^{N} Va(n)$$

$$\Delta t\_shift(n, n+1) = t\_pwm \times Va(n)/Va\_all$$

where n=1 to N, N is an integer of two or more, n+1=1 when n+1>N, and t_pwm is a cycle of the PWM signals, and
    wherein the effective voltage is an effective value (root mean square) of alternate voltage, which is supplied to a load.

3. A drive control device for performing drive control of a plurality of loads based on PWM signals, the device comprising:
    a PWM signal generator section for generating the PWM signals with different phases to be respectively fed to the loads; and
    a phase difference setting section for setting phase differences among the PWM signals,
    wherein the phase difference setting section sets phase differences $\Delta t\_shift(n,n+1)$ calculated based on an effective electric power $Pa(n)$ consumed by each of the loads, where the number of the loads is N, according to the equations below:

$$Pa(n) = Ia(n) \times Va(n)$$

$$Pa\_all = \sum_{n=1}^{N} Pa(n)$$

$$\Delta t\_shift(n, n+1) = t\_pwm \times Pa(n)/Pa\_all$$

where n=1 to N, N is an integer of two or more, n+1=1 when n+1>N, and t_pwm is a cycle of the PWM signals, and
    wherein the effective power is an effective value (root mean square) of alternate power, which is consumed by a load.

4. A drive control device for performing drive control of a plurality of loads based on PWM signals, the device comprising:
    a PWM signal generator section for generating the PWM signals with different phases to be respectively fed to the loads; and
    a phase difference setting section for setting phase differences among the PWM signals,
    wherein the phase difference setting section sets, in a switchable manner, one of sets of phase differences $\Delta t\_shift(n,n+1)$ calculated according to at least two of the equations (1) to (4) below:

$$\Delta t\_shift(n,n+1) = t\_pwm/N \tag{1}$$

where n=1 to N, N is an integer of two or more, n+1=1 when n+1>N, and t_pwm is a cycle of the PWM signals, $$Ia\_all = \sum_{n=1}^{N} Ia(n) \tag{2}$$

$$\Delta t\_shift(n, n+1) = t\_pwm \times Ia(n)/Ia\_all$$

where n=1 to N, N is an integer of two or more, n+1=1 when n+1>N, t_pwm is a cycle of the PWM signals, and Ia(n) is an effective current flowing to each of the N loads, $$Va\_all = \sum_{n=1}^{N} Va(n) \tag{3}$$

$$\Delta t\_shift(n, n+1) = t\_pwm \times Va(n)/Va\_all$$

where n=1 to N, N is an integer of two or more, n+1=1 when n+1>N, t_pwm is a cycle of the PWM signals, and Va(n) is an effective voltage fed to each of the N loads, and $$Pa(n) = Ia(n) \times Va(n) \qquad (4)$$

$$Pa\_all = \sum_{n=1}^{N} Pa(n)$$

$$\Delta t\_shift(n, n+1) = t\_pwm \times Pa(n)/Pa\_all$$

where n=1 to N, N is an integer of two or more, n+1=1 when n+1>N, t_pwm is a cycle of the PWM signals, and Pa(n) is an effective electric power consumed by each of the N loads, wherein the effective current is an effective value (root mean square) of alternate current that flows to a load, wherein the effective voltage is an effective value (root mean square) of alternate voltage, which is supplied to a load, and wherein the effective power is an effective value (root mean square) of alternate power, which is consumed by a load.

5. The drive control device as claimed in claim 4, wherein the phase difference setting section selects and sets one of at least two sets of phase differences Δt_shift(n,n+1) based on a total value of the effective currents Ia(n) flowing to the individual loads in each of cases where the at least two sets of phase differences Δt_shift(n,n+1) calculated according to the at least two of the equations (1) to (4) are respectively set for the PWM signals.

* * * * *